US011392387B2

(12) United States Patent
Kothinti Naresh et al.

(10) Patent No.: US 11,392,387 B2
(45) Date of Patent: Jul. 19, 2022

(54) PREDICTING LOAD-BASED CONTROL INDEPENDENT (CI) REGISTER DATA INDEPENDENT (DI) (CIRDI) INSTRUCTIONS AS CI MEMORY DATA DEPENDENT (DD) (CIMDD) INSTRUCTIONS FOR REPLAY IN SPECULATIVE MISPREDICTION RECOVERY IN A PROCESSOR

(71) Applicant: Microsoft Technology Licensing, LLC, Redmond, WA (US)

(72) Inventors: Vignyan Reddy Kothinti Naresh, Redmond, WA (US); Arthur Perais, Grenoble (FR); Rami Mohammad Al Sheikh, Morrisville, NC (US); Shivam Priyadarshi, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/089,379

(22) Filed: Nov. 4, 2020

(65) Prior Publication Data

US 2022/0137977 A1 May 5, 2022

(51) Int. Cl.
*G06F 9/38* (2018.01)
(52) U.S. Cl.
CPC .......... *G06F 9/3861* (2013.01); *G06F 9/3834* (2013.01); *G06F 9/3842* (2013.01)
(58) Field of Classification Search
CPC .... G06F 9/3861; G06F 9/3834; G06F 9/3842; G06F 9/3859; G06F 9/3826
See application file for complete search history.

(56) References Cited

U.S. PATENT DOCUMENTS

| 6,542,984 B1 * | 4/2003 | Keller ................. G06F 9/3838 712/214 |
| 11,061,683 B2 * | 7/2021 | Kothinti Naresh ... G06F 9/3834 |

(Continued)

OTHER PUBLICATIONS

Al-Zawawi, et al., "Transparent Control Independence (TCI)", In Proceedings of the 34th Annual International Symposium on Computer Architecture, Jun. 9, 2007, pp. 448-459.

(Continued)

*Primary Examiner* — Keith E Vicary
(74) *Attorney, Agent, or Firm* — Withrow & Terranova, PLLC

(57) ABSTRACT

Predicting load-based control independent (CI), register data independent (DI) (CIRDI) instructions as CI memory data dependent (DD) (CIMDD) instructions for replay in speculative misprediction recovery in a processor. The processor predicts if a source of a load-based CIRDI instruction will be forwarded by a store-based instruction (i.e. "store-forwarded"). If a load-based CIRDI instruction is predicted as store-forwarded, the load-based CIRDI instruction is considered a CIMDD instruction and is replayed in misprediction recovery. If a load-based CIRDI instruction is not predicted as store-forwarded, the processor considers such load-based CIRDI instruction as a pending load-based CIRDI instruction. If this pending load-based CIRDI instruction is determined in execution to be store-forwarded, the instruction pipeline is flushed and the pending load-based CIRDI instruction is also replayed in misprediction recovery. If this pending load-based CIRDI instruction is not determined in execution to be store-forwarded, the pending load-based CIRDI instruction is not replayed in misprediction recovery.

24 Claims, 10 Drawing Sheets

(56) References Cited

U.S. PATENT DOCUMENTS

| | | |
|---|---|---|
| 2005/0138480 A1 | 6/2005 | Srinivasan et al. |
| 2005/0247774 A1 | 11/2005 | Sander et al. |
| 2006/0150161 A1 | 7/2006 | Onder |
| 2010/0306509 A1 | 12/2010 | Day et al. |
| 2011/0040955 A1 | 2/2011 | Hooker et al. |
| 2015/0026685 A1* | 1/2015 | Spadini ................ G06F 9/3842 718/102 |
| 2015/0089186 A1 | 3/2015 | Kim et al. |
| 2017/0185404 A1* | 6/2017 | Mekkat ................ G06F 9/3826 |
| 2020/0394040 A1 | 12/2020 | Kothinti et al. |

OTHER PUBLICATIONS

Rotenberg, et al., "Control Independence in Trace Processors", In Proceedings of the 32nd Annual ACM/IEEE International Symposium on Microarchitecture, Nov. 16, 1999, pp. 4-15.

"International Search Report and Written Opinion Issued in PCT Application No. PCT/US20/030162," dated Aug. 18, 2020, 15 Pages.

"Notice of Allowance Issued in U.S. Appl. No. 16/440,062," dated Mar. 9, 2021, 21 Pages.

"International Search Report and Written Opinion Issued in PCT Application No. PCT/US21/048334", dated Dec. 21, 2021, 10 Pages.

* cited by examiner

MDD
TRACKING MEMORY
(800)

| | LOAD ID | MDD IND | FSID |
|---|---|---|---|
| 802(0) | 15 | 1 | 1 |
| 802(1) | 10 | 0 | 0 |
| 802(2) | 17 | 0 | 0 |
| ⋮ | | | |
| | 20 | 1 | 7 |
| | ⋮ | ⋮ | ⋮ |
| 802(N) | | | |

804 — LOAD ID
806 — MDD IND
808 — FSID

FIG. 8

PREDICTING LOAD-BASED CONTROL INDEPENDENT (CI) REGISTER DATA INDEPENDENT (DI) (CIRDI) INSTRUCTIONS AS CI MEMORY DATA DEPENDENT (DD) (CIMDD) INSTRUCTIONS FOR REPLAY IN SPECULATIVE MISPREDICTION RECOVERY IN A PROCESSOR

FIELD OF THE DISCLOSURE

The technology of the disclosure relates generally to speculative prediction of control flow computer instructions ("instructions") in an instruction pipeline of a processor, and more particularly to misprediction recovery after a speculative prediction of a control flow instruction is resolved at execution as a misprediction.

BACKGROUND

Instruction pipelining is a processing technique whereby the throughput of computer instructions being executed by a processor may be increased by splitting the handling of each instruction into a series of steps. These steps are executed in an execution pipeline composed of multiple stages. Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional control instruction, such as a conditional branch instruction, may redirect the flow path of instruction execution based on conditions evaluated when the condition of the control branch instruction is executed. As a result, the processor may have to stall the fetching of additional instructions until a conditional control instruction has executed, resulting in reduced processor performance and increased power consumption.

One approach for maximizing processor performance involves utilizing a prediction circuit to speculatively predict the result of a condition that will control the instruction execution flow path. For example, the prediction of whether a conditional branch instruction will be taken can be based on a branch prediction history of previous conditional branch instructions. When the control flow instruction finally reaches the execution stage of the instruction pipeline and is executed, the resultant target address of the control flow instruction is verified by comparing it with the previously predicted target address when the control flow instruction was fetched. If the predicted and actual target addresses match, meaning a correct prediction was made, delay is not incurred in instruction execution because the subsequent instructions at the target address will have been correctly fetched and already be present in the instruction pipeline when the conditional branch instruction reaches an execution stage of the instruction pipeline. However, if the predicted and actual target addresses do not match, a mispredicted branch hazard occurs in the instruction pipeline that causes a precise interrupt. As a result, the instruction pipeline is flushed and the instruction pipeline fetch unit is redirected to fetch new instructions starting from the target address, resulting in delay and reduced performance. This is also known as the "misprediction penalty." Also, stages in the execution pipeline may remain dormant until the newly fetched instructions make their way through the instruction pipeline to the execution stage, thereby reducing performance. Misprediction in the processing of instructions in a processor is costly in terms of the resulting delay and reduced performance.

One method to lower the misprediction penalty is to utilize control independence techniques. Control independence (CI) refers to a region of instructions that executes regardless of an instruction control flow path direction. In other words, control independent (CI) instructions are independent of the control decision by a branch. This is shown by example in an instruction stream 100 in FIG. 1 illustrated in the form of a flowchart 102. The instruction stream 100 includes a conditional branch instruction 104. The instruction execution flow path will either take flow path 106(1) or flow path 106(2) depending on the resolution of the condition (i.e., predicate) in the conditional branch instruction 104. A processor can speculatively predict the outcome of the predicate before the conditional branch instruction 104 reaches an execution stage in the instruction pipeline and go ahead and insert instructions in the predicted flow path into the instruction pipeline to be executed to avoid processing delay. Instructions 108(1), 108(2) that are in one of the two respective instruction control flow paths 106(1), 106(2) in a respective control dependent (CD) region 110(1), 110(2) of the instruction stream 100 are CD instructions 108(1), 108(2). CD instructions are instructions that are only executed dependent on the flow path 106(1), 106(2) taken based on the resolution of the predicate in the conditional branch instruction 104. There are other instructions 112 in a CI region 114 in the instruction stream 100 that are inserted in the instruction pipeline and get executed regardless of which instruction control flow path 106(1), 106(2) is taken as a result from the conditional branch instruction 104. These instructions 112 are also known as CI instructions 112. The CI instructions 112 can be further classified based on their data dependence on CD instructions 108(1) or 108(2) in the flow path 106(1), 160(2) taken in a respective CD region 110(1) or 110(2). If a CI instruction 112 (e.g., a load instruction) is dependent on data produced by a CD instruction 108(1) or 108(2) (e.g., a store instruction) in a CD region 110(1) or 110(2) of the instruction stream 100, the CI instruction 112 is a CI, data dependent (DD) (CIDD) instruction 112D; otherwise, it is a CI, data independent (DI) (CIDI) instruction 112I. CIDD instructions can be further classified as either dependent on register data known as CI register DD (CIRDD) instructions, or dependent on memory data known as CI memory DD (CIMDD) instructions.

Control independence techniques can be performed when executing the instructions in the instruction stream 100 in FIG. 1 to identify the CIDD instructions 112D among the CI instructions 112 in the CI region 114 of the instruction stream 100. Control independence techniques involve CIDD instructions 112D being re-executed as part of a misprediction recovery to guarantee functional correctness. This is because while the CIDD instructions 112D in the CI instructions 112 are inserted in the instruction pipeline to be executed by a processor regardless of the flow path 106(1), 106(2) taken, the CD instructions 108(1) or 108(2) that were executed based on speculative prediction of the conditional branch instruction 104 will not be executed in misprediction recovery. Instead, the CD instructions 108(1) or 108(2) that were not previously executed based on speculative prediction of the conditional branch instruction 104 will be executed in misprediction recovery. This means that the data produced by the CD instructions 108(1), 108(2) that were previously executed based on a speculative misprediction and consumed by CIDD instructions 112D may not be accurate. The misprediction recovery effectively adds CD produced data from the CD instructions 108(1) or 108(2) that are executed in misprediction recovery. Thus, the misprediction recovery effectively "removes" the CD instructions 108(1) or 108(2) that were executed based on speculative misprediction, thus effectively removing their CD produced data.

To address the issue of the CIDD instructions 112D having been executed based on later removed CD data in misprediction recovery, a processor can mark the CIDD instructions 112D to be replayed for execution in misprediction recovery. In this manner, any added stored CD data that affects the CIDD instructions 112D will be used in the re-processing of the CIDD instructions 112D in misprediction recovery. Thus, to perform the aforementioned CI techniques, a processor has to detect if a fetched CI instruction to be processed for execution is a CIDI instruction or CIDD instruction. A CIRDD instruction is easier to detect in the front-end stage of an instruction pipeline of a processor due to the register speculation nature of the instruction. However, it can be more difficult to detect if a load-based CI register DI (CIRDI) instruction is actually a DD instruction as a CIMDD instruction that should also be replayed in misprediction recovery. A load-based CIRDI instruction can be a CIMDD instruction if its source register value is forwarded by a store-based instruction that is either CD or CIDD. The head of a CIMDD instruction is a load instruction. Thus, a CIMDD characteristic of a load-based CIRDI instruction can be speculated in a front-end stage of an instruction pipeline in a processor, but the CIMDD characteristic cannot be guaranteed until execution. This is because the store-forward nature of a load-based CIRDI instruction is not available to the processor to be detected until the load-based instruction actually starts executing.

One way to simplify CI techniques for identifying CIMDD instructions for replay in misprediction recovery is to categorize any load-based CIRDI instructions and their dependent instructions as CIMDD instructions whether such instructions are actually CI memory DI (CIMDI) or CIMDD instructions. Thus, the processor can replay all such identified load-based CIRDI instructions as CIMDD instructions if they were determined at execution time to be forwarded by a store instruction. However, classifying all load-based CIRDI instructions as CIMDD instructions may classify instructions as DD that are actually CIDI instructions. Keeping all the dependent instructions of the CIRDI instructions will stress the replay structures used for recovery and can limit the speculation window depth or the effectiveness of the employed CI recovery techniques. In some implementations, this would also cause such CIDI instructions to be reprocessed for execution unnecessarily in misprediction recovery even though the data resulting from processing and/or execution of such CIDI instructions will be unaffected in misprediction recovery. This increases misprediction recovery latency.

SUMMARY

Exemplary aspects disclosed herein include predicting load-based control independent (CI), register data independent (DI) (CIRDI) instructions as CI memory data dependent (DD) (CIMDD) instructions for replay in speculative misprediction recovery in a processor. Related methods are also disclosed. The processor is configured to speculatively predict the outcome of a condition (i.e., predicate) of conditional control instructions (e.g., conditional branch, conditional call, conditional return, branch table instructions) to pre-fetch instructions in a predicted instruction control flow path into an instruction pipeline to be processed to reduce instruction fetch delay. In exemplary aspects, a processor is configured to identify CIDD instructions in an instruction pipeline for replay in misprediction recovery. CIDD instructions are replayed in misprediction recovery since these instructions were executed based on consuming stored data from a control dependent (CD) instruction in the incorrect instruction control flow path, and thus the consumed data by the CIDD instruction may have been inaccurate. Store-forward load-based CI register DD (CIRDD) instructions can also be CIDD instructions as CIMDD instructions if its source register value is forwarded by a store-based instruction that is either a CD or CIDD instruction. However, a CIMDD characteristic of a store-forward load-based CIRDI instruction is more difficult to detect than a CIRDD instruction. The CIMDD characteristic of a load-based CIRDI instruction can be speculated in a front-end stage of an instruction pipeline in a processor, but the CIMDD characteristic cannot be guaranteed until its execution. One way to simplify CI techniques for identifying CIMDD instructions for replay in misprediction recovery is to categorize any load-based CIRDI instructions and their dependent instructions as CIMDD instructions whether such instructions are actually CI memory DI (CIMDI) or CIMDD instructions.

In exemplary aspects disclosed herein, to avoid classifying all load-based CIRDI instructions as CIMDD instructions that will then be replayed in misprediction recovery, a processor is configured to predict if a source of a load-based CIRDI instruction will be forwarded by a store-based instruction. If a load-based CIRDI instruction is predicted as a store-forward load-based CIRDI instruction, the load-based CIRDI instruction is considered as having a CIMDD characteristic as a CIMDD instruction. All its dependent instructions can also be considered having a CIMDD characteristic as CIMDD instructions. Such CIMDD instructions are replayed in the processor in misprediction recovery. If, however, a load-based CIRDI instruction is not predicted as a store-forward load-based CIRDI instruction, this does not necessarily mean that the load-based CIRDI instruction is not actually dependent on a store-based CD instruction. The determination of whether the load-based CIRDI instruction is actually dependent on a store-based instruction can be determined from execution of the load-based CIRDI instruction. Thus, in this instance, the processor can consider such load-based CIRDI instruction as a pending load-based CIRDI instruction. If this pending load-based CIRDI instruction is then determined to be dependent on a forwarded store from a store-based instruction in execution, the processor will cause the instruction pipeline to be flushed and the pending load-based CIRDI instruction will also be replayed in misprediction recovery. If this pending load-based CIRDI instruction is not determined to be dependent on a forwarded store from a store-based instruction in execution, the pending load-based CIRDI instruction will not be replayed in any misprediction recovery.

In this manner, the processor can avoid replaying all load-based CIRDI instructions in misprediction recovery as CIMDD instructions while guaranteeing functional correctness. This can reduce misprediction recovery latency in the processor while also still replaying load-based CIDI instructions that were not predicted to be depending on store-based instructions, but actually were determined to be so dependent in execution.

In this regard, in one exemplary aspect, a processor is provided. The processor comprises an instruction processing circuit comprising one or more instruction pipelines. The instruction processing circuit is configured to fetch a plurality of instructions from a memory into an instruction pipeline among the one or more instruction pipelines, the plurality of fetched instructions in the one or more instruction pipelines comprising an instruction stream comprising at least one CI instruction region and a plurality of CD instruction regions. The instruction processing circuit is configured to speculatively predict a predicate in a conditional control instruction in the instruction stream. The instruction processing circuit is configured to process fetched instructions in the instruction stream comprising fetched instructions in a first CD instruction region among the plurality of CD instruction regions in the instruction stream taken based on the speculative prediction and comprising a load-based CIRDI instruction in a CI instruction region among the at least one CI instruction region. The instruction processing circuit is configured to predict if the load-based CIRDI instruction is a CIMDD instruction, based on predicting if a store-based CD instruction designates a forward store for consumption by the load-based CIRDI instruction. In response to the load-based CIRDI instruction being predicted as a CIMDD instruction, designate the load-based CIRDI instruction as a CIMDD instruction, the instruction processing circuit is also configured to execute the conditional control instruction to resolve the predicate of the conditional control instruction, determine if the speculative prediction matches the resolved predicate from execution of the conditional control instruction. In response to the speculative prediction not matching the resolved predicate in execution of the conditional control instruction, the instruction processing circuit is configured to generate a pipeline flush event. In response to the generated pipeline flush event, the instruction processing circuit is configured to process the fetched instructions in a second CD instruction region among the plurality of CD instruction regions in the instruction stream taken based on the resolved predicate from execution of the conditional control instruction, and in response to the load-based CIRDI instruction being designated as a CIMDD instruction, replay the load-based CIRDI instruction.

In another exemplary aspect, a method of predicting a load-based CIRDI instructions as CIMDD instructions for replay in speculative misprediction recovery in a processor is provided. The method comprises fetching a plurality of instructions from a memory into an instruction pipeline among one or more instruction pipelines, the plurality of fetched instructions in the one or more instruction pipelines comprising an instruction stream comprising at least one CI instruction region and a plurality of CD instruction regions. The method also comprises speculatively predicting a predicate in a conditional control instruction in the instruction stream. The method also comprises processing fetched instructions in the instruction stream comprising fetched instructions in a first CD instruction region among the plurality of CD instruction regions in the instruction stream taken based on the speculative prediction and comprising a load-based CIRDI instruction in a CI instruction region among the at least one CI instruction region. The method also comprises predicting if the load-based CIRDI instruction is a CIMDD instruction based on predicting if a store-based CD instruction designates a forward store for consumption by the load-based CIRDI instruction. The method also comprises designating the load-based CIRDI instruction as a CIMDD instruction, in response to the load-based CIRDI instruction being predicted as a CIMDD instruction. The method also comprises executing the conditional control instruction to resolve the predicate of the conditional control instruction. The method also comprises determining if the speculative prediction matches the resolved predicate from execution of the conditional control instruction. The method also comprises generating a pipeline flush event, in response to the speculative prediction not matching the resolved predicate in execution of the conditional control instruction. In response to the generated pipeline flush event, The method also comprises processing the fetched instructions in a second CD instruction region among the plurality of CD instruction regions in the instruction stream taken based on the resolved predicate from execution of the conditional control instruction, and replaying the load-based CIRDI instruction, in response to the load-based CIRDI instruction being designated as a CIMDD instruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an instruction stream in flowchart form illustrating a conditional branch instruction, control dependent (CD) instructions that are executed dependent on the instruction control flow path taken from a prediction or resolution of the predicate of the conditional branch instruction, and control independent (CI) instructions that are executed irrespective of the instruction control flow path taken from the conditional branch instruction;

Figures 3A, 3B:
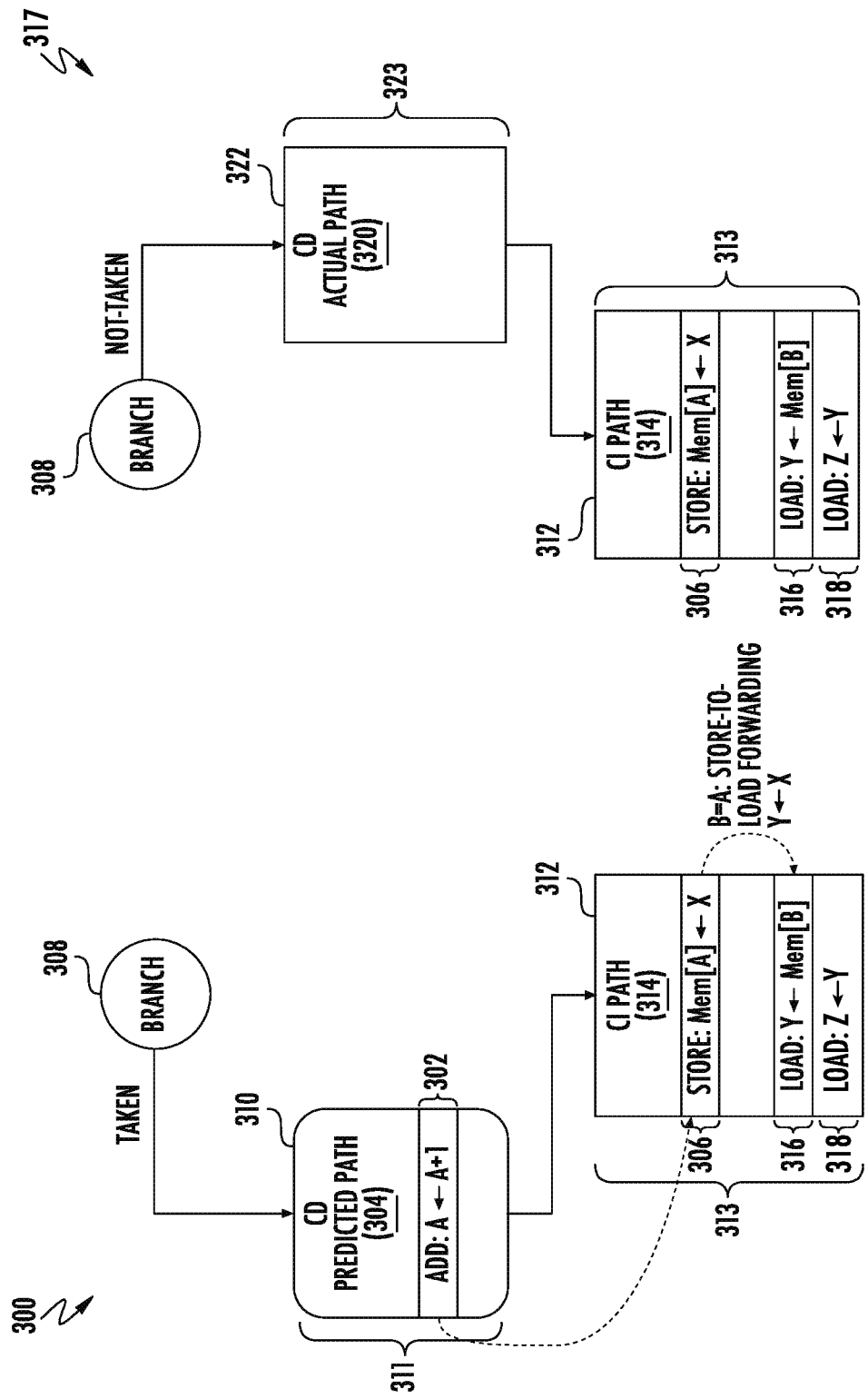
FIG. 3A is an instruction stream in flowchart form illustrating a CI, data dependent (DD) (CIDD) store from a store-based CI instruction having a memory dependence on a CD store from a store-based CD instruction in an incorrect, predicted instruction control flow path taken, wherein the CIDD store is forwarded to a CI load in a load-based CI instruction.
Figure 4B:
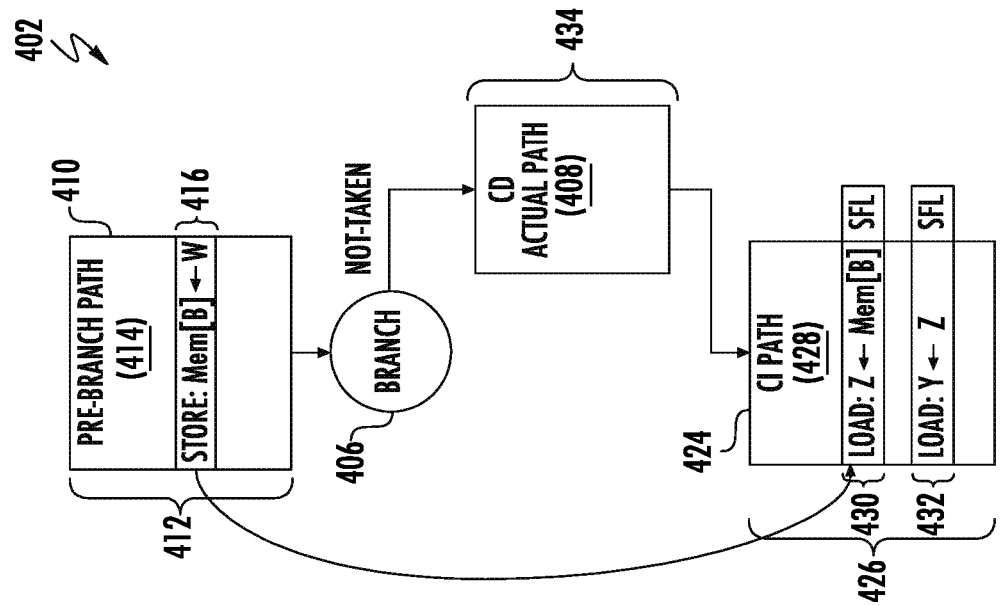
Figure 4A:
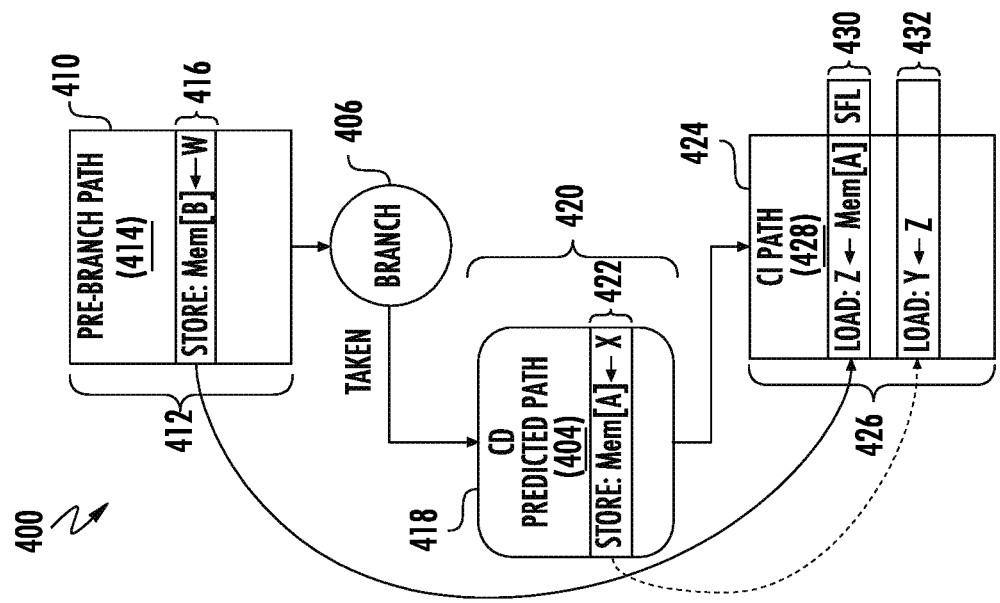
Figure 5:
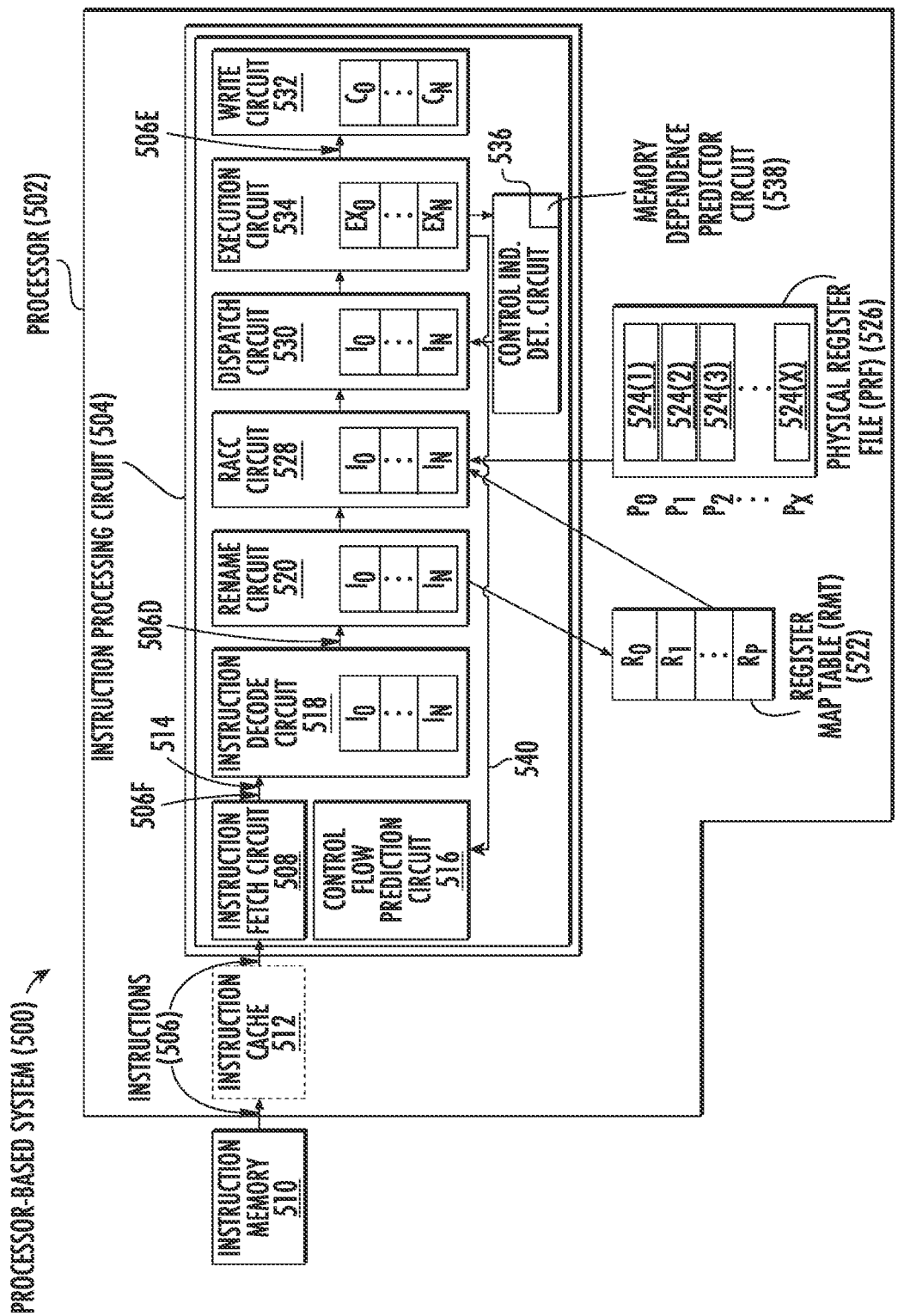
Figure 6:
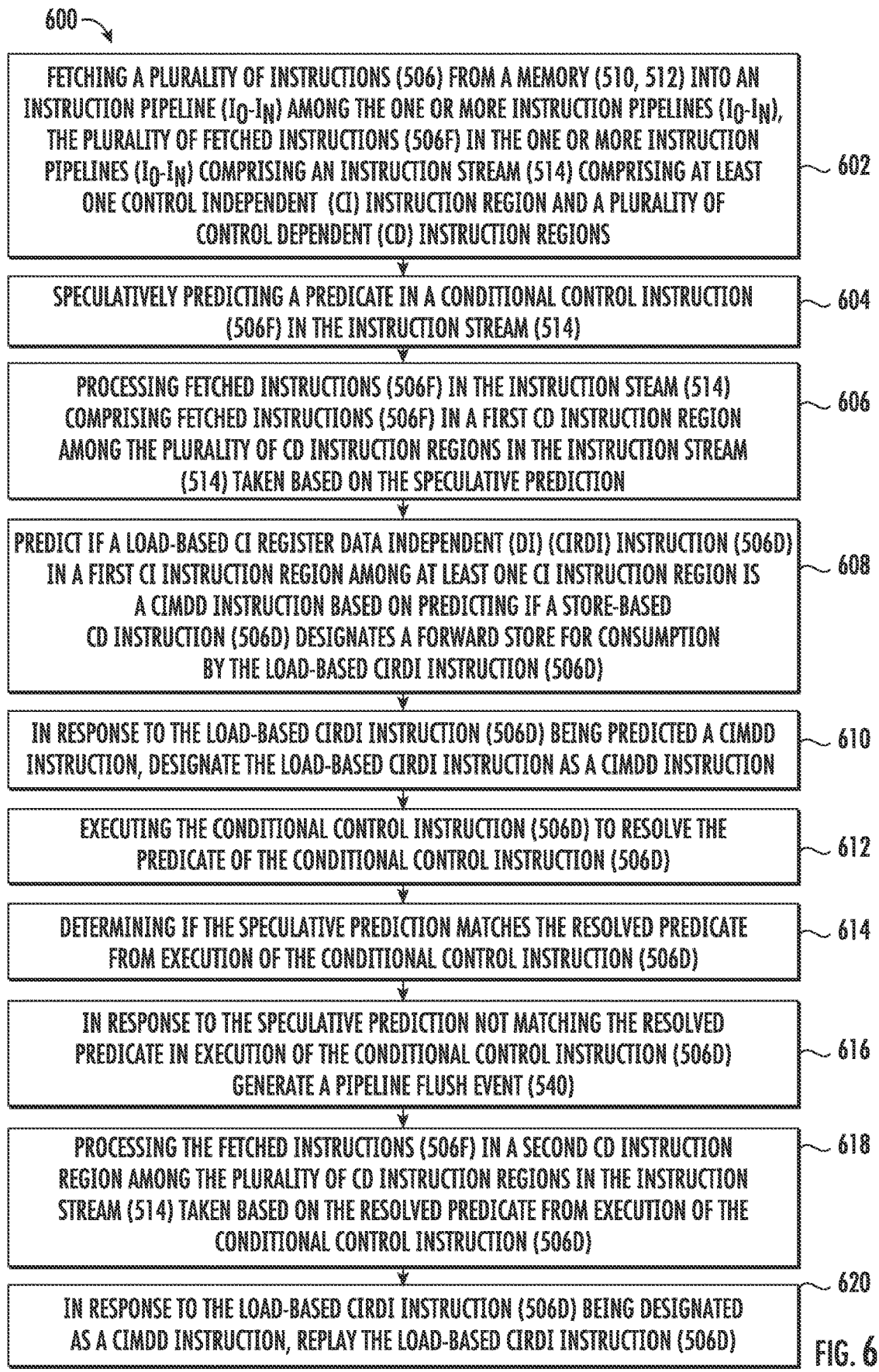
Figure 7:
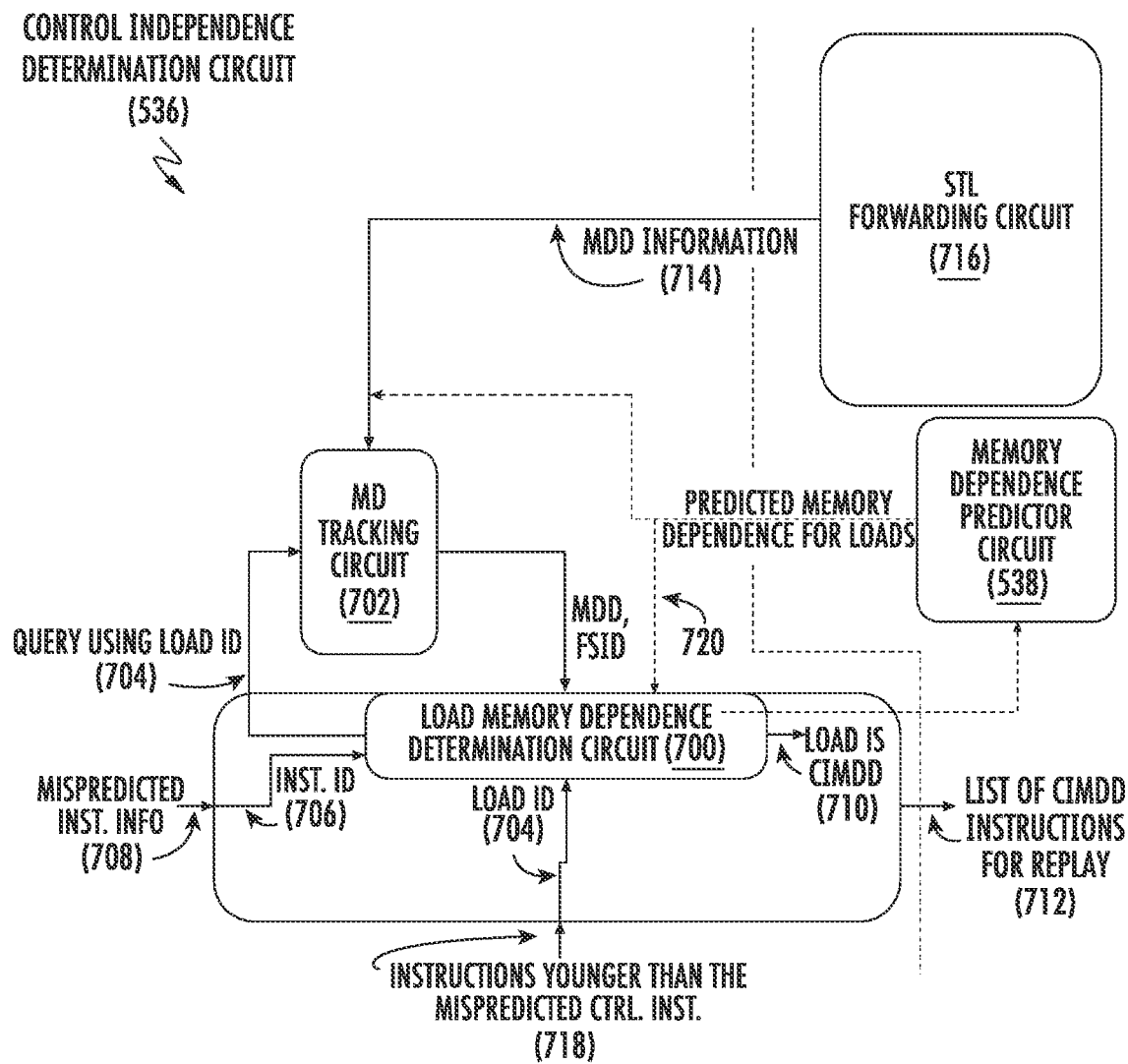
Figure 9:
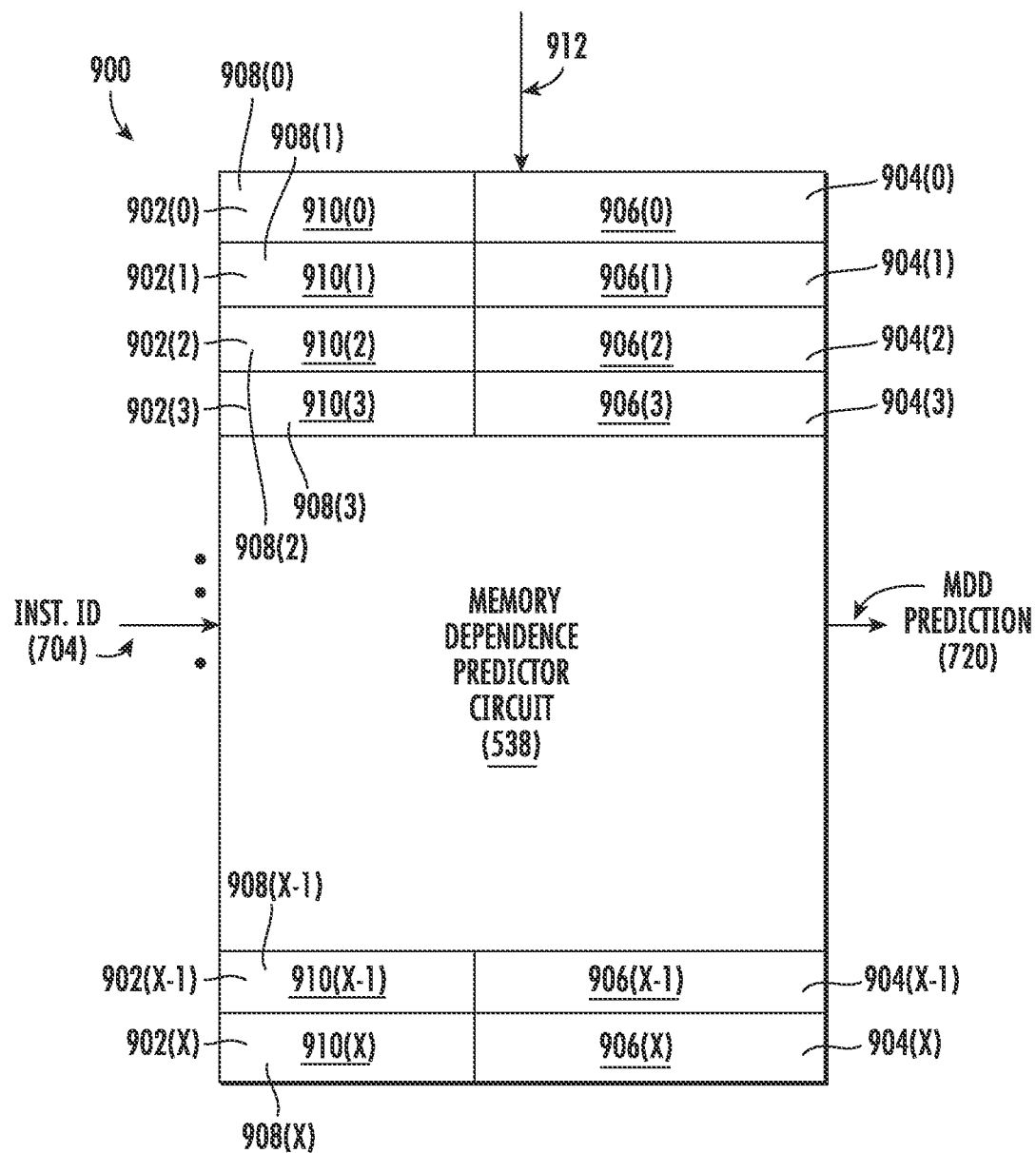
Figure 10:
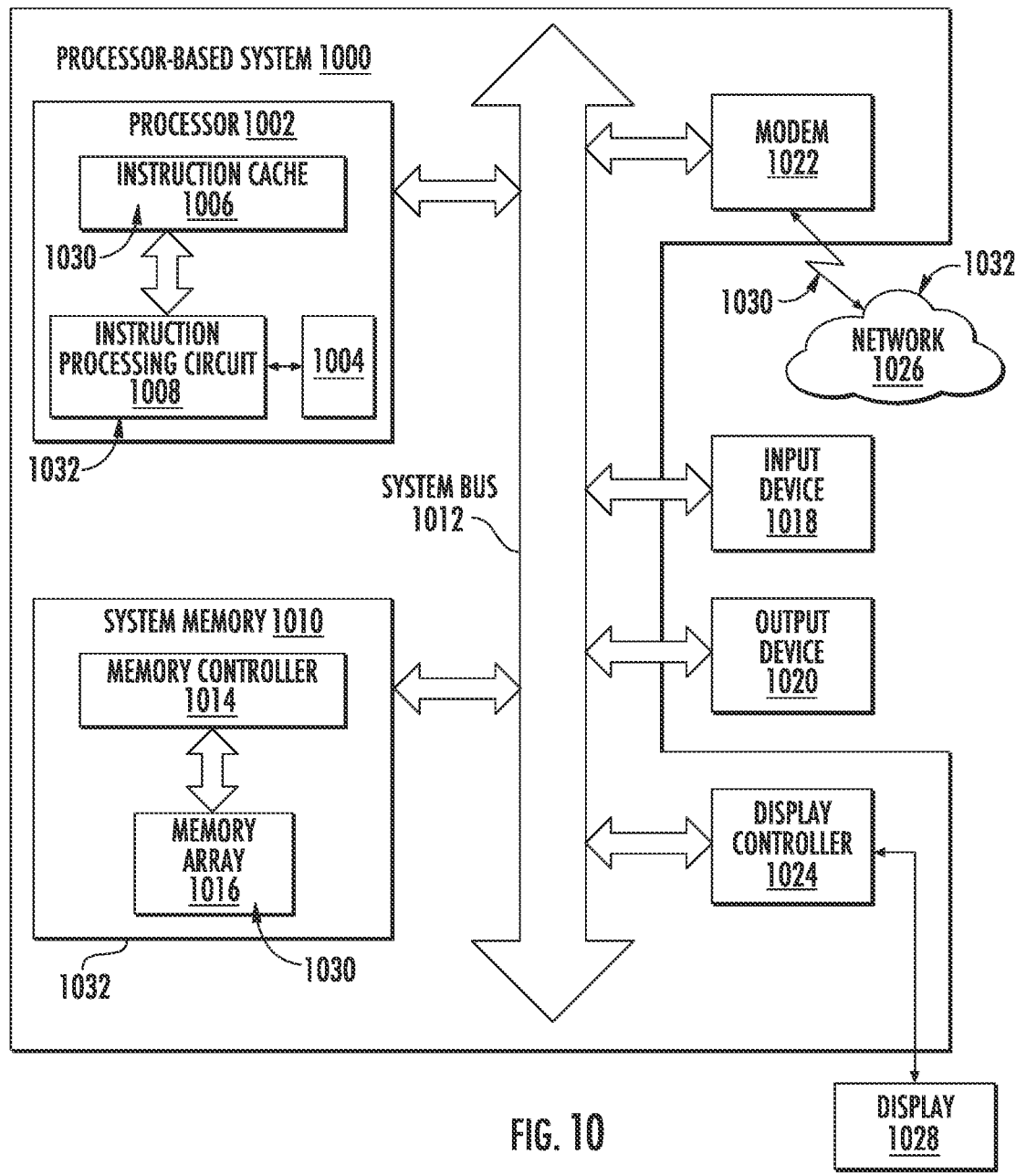

FIG. 3B is an instruction stream in flowchart form processed in misprediction recovery illustrating removal of the CD store from the incorrectly predicted instruction control flow path in FIG. 3A, resulting in an illegal CIDD store in the store-based CI instruction in FIG. 3A based on the incorrect predicted instruction control flow path taken, thus resulting in an illegal CI load in the load-based CI instruction in FIG. 3A;

FIG. 4A is an instruction stream in flowchart form that illustrates tracking of store-forward memory dependencies between stores and CI loads in load-based CI instructions in a CI instruction stream following a predicted, incorrect CD instruction control flow path taken from a conditional control instruction, wherein the CI loads are forwarded from a CD store in a store-based CD instruction and a CI store in a store-based CI instruction;

FIG. 4B is an instruction stream in flowchart form that illustrates the designation of the load-based CI instructions in the CI instruction stream in FIG. 4A in misprediction recovery for replay, based on the CI loads of the load-based CI instruction being designated as CIDD loads;

FIG. 5 is a schematic diagram of an exemplary processor-based system that includes a processor with one or more instruction pipelines for processing computer instructions for execution, wherein the processor includes a control independence determination circuit communicatively coupled to the instruction pipeline and configured to predict a store-forward dependence of load-based CI register, data independent (DI) (CIRDI) instructions as CI memory DD (CIMDD) instructions, and selectively designated such predicted store-forward load-based CIRDI instructions in the CI instruction stream as CIMDD instructions, for replay in misprediction recovery;

FIG. 6 is a flowchart illustrating an exemplary process of a processor, such as the processor in FIG. 5, predicting a store-forward dependence of load-based CIRDI instructions in a CI instruction stream, and selectively designating such predicted store-forward load-based CIRDI instructions in the CI instruction stream as CIMDD instructions for replay in misprediction recovery;

FIG. 7 is a schematic diagram illustrating exemplary details of a control independence determination circuit that can be provided in the processor in FIG. 5 to predict store-forward dependencies for CI loads in load-based CIRDI instructions in a CI instruction stream, and selectively designate predicted store-forward load-based CIRDI instructions in the CI instruction stream as CIMDD instructions for replay in misprediction recovery;

FIG. 8 is an exemplary memory dependence (MD) tracking memory controlled by an exemplary MD tracking circuit in the control independence determination circuit in FIG. 7, wherein the MD tracking memory is configured to store load-based CI instruction entries by a load identifier (ID), and for each load ID, an identification of whether the consumed load for the load-based CI instruction was forwarded by a produced store from a store-based instruction and the ID of any such store instruction;

FIG. 9 is an exemplary memory dependence predictor circuit that can be provided in the control independence determination circuit in FIG. 7, to predict store-forward memory dependencies for CI loads in load-based CIRDI instructions in a CI instruction stream; and FIG. 10 is a block diagram of an exemplary processor-based system that includes a processor with one or more instruction pipelines for processing computer instructions for execution and a control independence determination circuit communicatively coupled to the instruction pipeline and configured to predict a store-forward dependence of load-based CIRDI instructions, and selectively designated such predicted store-forward load-based CIRDI instructions in the CI instruction stream as CIMDD instructions for replay in misprediction recovery, wherein the processor can include, without limitation, the processor in FIG. 5 and the control independence determination circuit can include, without limitation, the control independence determination circuit in FIG. 7.

DETAILED DESCRIPTION

Exemplary aspects disclosed herein include predicting load-based control independent (CI), register data independent (DI) (CIRDI) instructions as CI memory data dependent (DD) (CIMDD) instructions for replay in speculative misprediction recovery in a processor. Related methods are also disclosed. The processor is configured to speculatively predict the outcome of a condition (i.e., predicate) of conditional control instructions (e.g., conditional branch, conditional call, conditional return, branch table instructions) to pre-fetch instructions in a predicted instruction control flow path into an instruction pipeline to be processed to reduce instruction fetch delay. In exemplary aspects, a processor is configured to identify CIDD instructions in an instruction pipeline for replay in misprediction recovery. CIDD instructions are replayed in misprediction recovery since these instructions were executed based on consuming stored data from a control dependent (CD) instruction in the incorrect instruction control flow path, and thus the consumed data by the CIDD instruction may have been inaccurate. Store-forward load-based CI register DD (CIRDD) instructions can also be CIDD instructions as CIMDD instructions if its source register value is forwarded by a store-based instruction that is either CD or CIDD instruction. However, a CIMDD characteristic of a store-forward load-based CIRDI instruction is more difficult to detect than a CIRDD instruction. The CIMDD characteristic of a store-forward load-based CIRDI instruction can be speculated in a front-end stage of an instruction pipeline in a processor, but the CIMDD characteristic cannot be guaranteed until its execution. One way to simplify CI techniques for identifying CIMDD instructions for replay in misprediction recovery is to categorize any load-based CIRDI instructions and their dependent instructions as a CIMDD instructions whether such instructions are actually CI memory DI (CIMDI) or CIMDD instructions.

In exemplary aspects disclosed herein, to avoid classifying all load-based CIRDI instructions as CIMDD instructions that will then be replayed in misprediction recovery, a processor is configured to predict if a source of a load-based CIRDI instruction will be forwarded by a store-based instruction. If a load-based CIRDI instruction is predicted as a store-forward load-based CIRDI instruction, the load-based CIRDI instruction is considered as having a CIMDD characteristic as a load-based CIMDD instruction. All its dependent instructions can also be considered having a CIMDD characteristic as CIMDD instructions. Such CIMDD instructions are replayed in the processor in misprediction recovery. If, however, a load-based CIRDI instruction is not predicted as a store-forward load-based CIRDI instruction, this does not necessarily mean that the load-based CIRDI instruction is not actually dependent on a store-based CD instruction. The determination of whether the load-based CIRDI instruction is actually dependent on a store-based instruction can be determined from execution of the load-based CIRDI instruction. Thus, in this instance, the processor can consider such load-based CIRDI instruction as a pending load-based CIRDI instruction. If this pending load-based CIRDI instruction is then determined to be dependent on a forwarded store from a store-based instruction in execution, the processor will cause the instruction pipeline to be flushed and the pending load-based CIRDI instruction will also be replayed in misprediction recovery. If this pending load-based CIRDI instruction is not determined to be dependent on a forwarded store from a store-based instruction in execution, the pending load-based CIRDI instruction will not be replayed in any misprediction recovery.

In this manner, the processor can avoid replaying all store-forward, load-based CIRDI instructions in misprediction recovery as CIMDD instructions. This can reduce misprediction recovery latency in the processor while also still replaying load-based CIDI instructions that were not predicted to be depending on store-based instructions, but actually were determined to be so dependent in execution.

Before discussing prediction of store-forward dependence of load-based CIRDI instructions as CIMDD instructions, and selectively designating such predicted store-forward load-based CIRDI instructions in the CI instruction stream as CIMDD instructions for replay in misprediction recovery starting at FIG. 4A, FIGS. 2A-2B and 3A-3B are provided and first discussed. FIGS. 2A-2B and 3A-3B are provided to illustrate a store-forward memory data dependency between a store-based CD instruction and the load-based CIRDI instruction.

Figure 1:
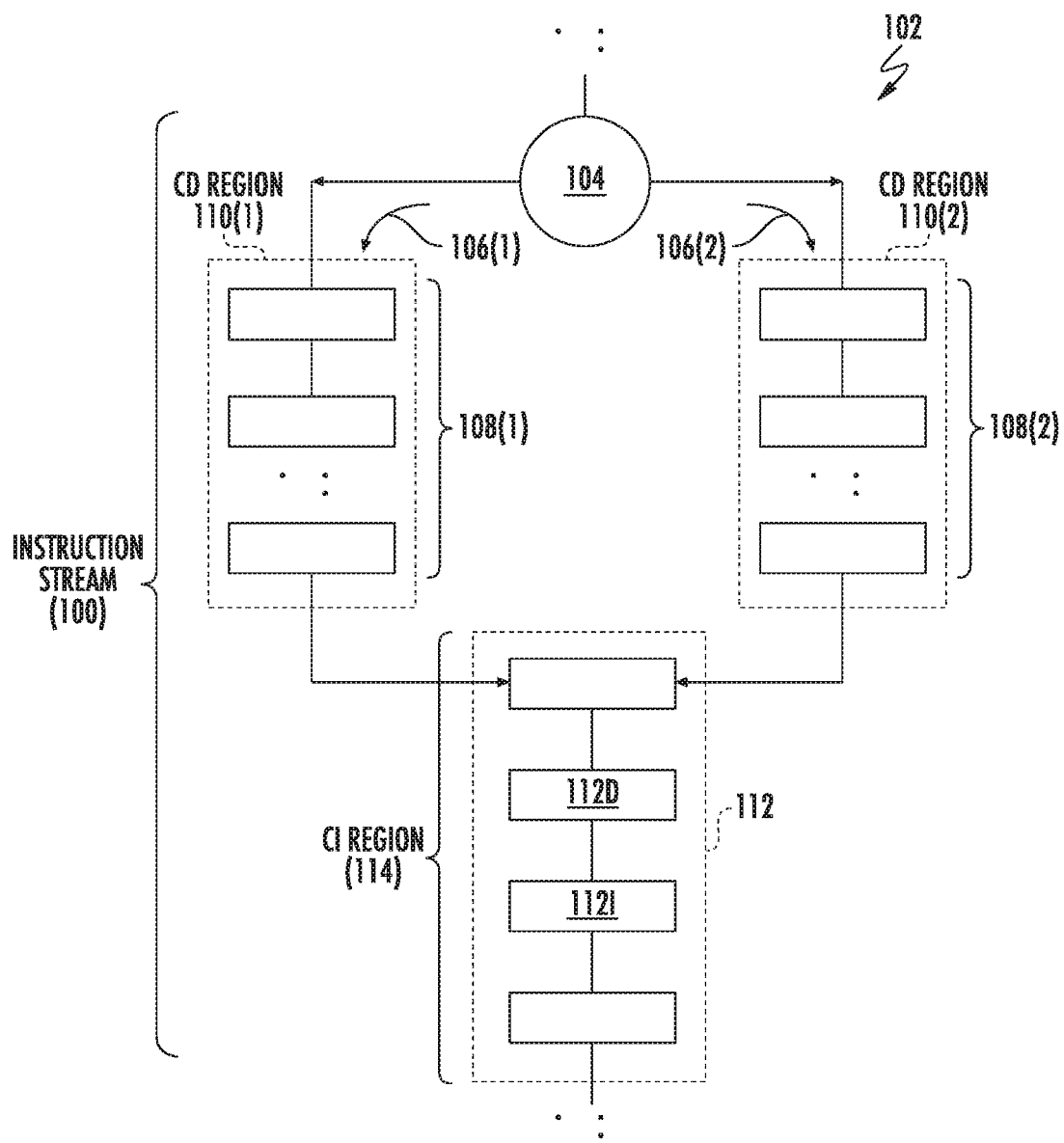
Figure 2B:
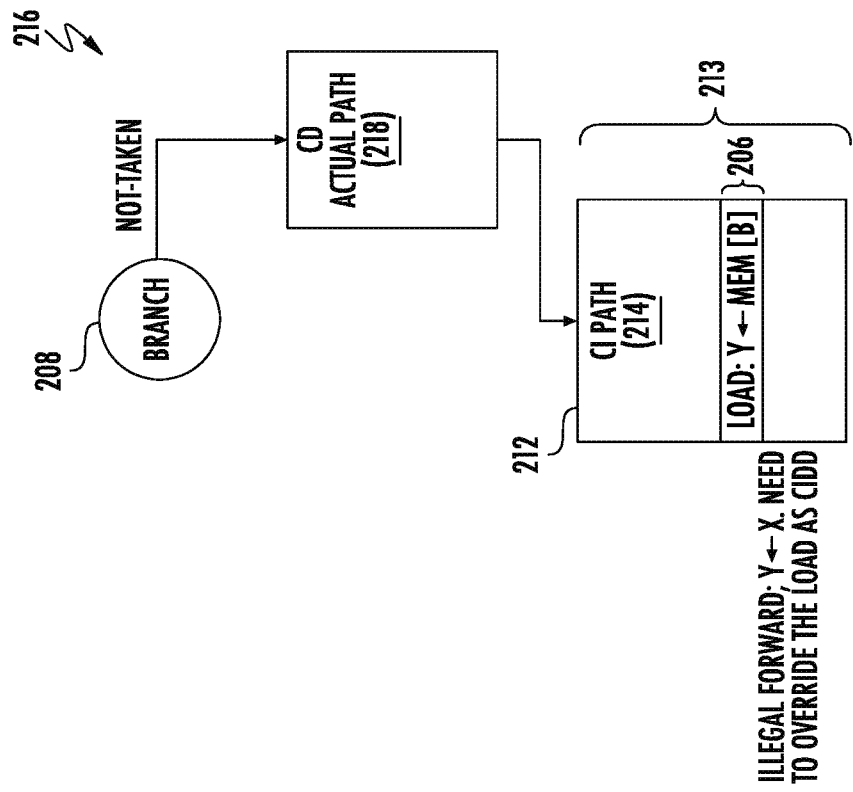
FIG. 2B is an instruction stream in flowchart form processed in misprediction recovery illustrating removal of the CD store from the incorrectly predicted instruction control flow path in FIG. 2A, resulting in an illegal CI load in the load-based CI instruction in FIG. 2A based on the incorrect predicted instruction control flow path taken.
Figure 2A:
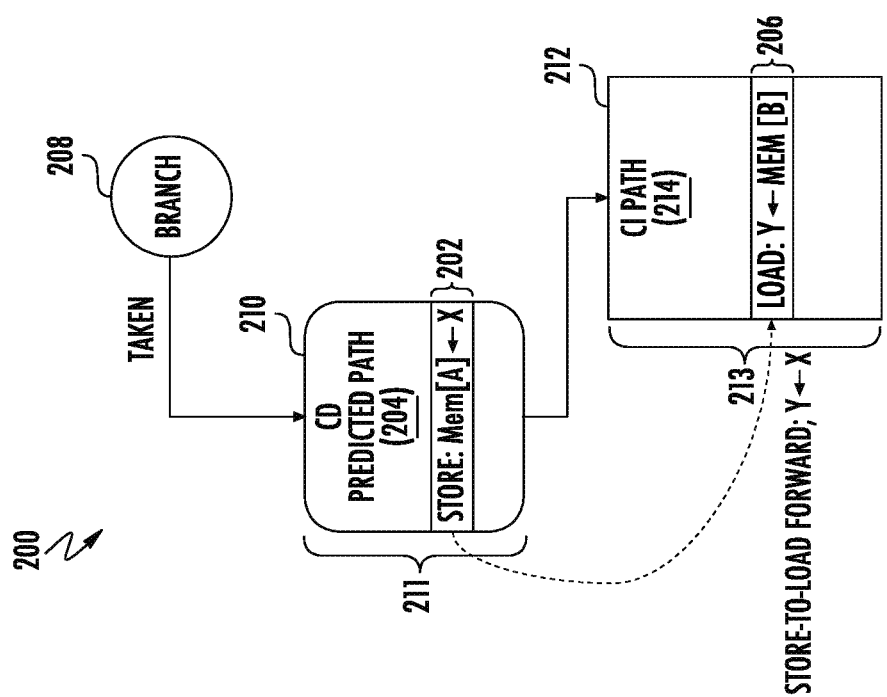
FIG. 2A is an instruction stream in flowchart form illustrating a CD store from a store-based CD instruction resulting from an incorrect predicted instruction control flow path taken, which is forwarded to a memory-dependent CI load in a load-based CI instruction.

In this regard, FIG. 2A is an instruction stream 200 in flowchart form illustrating a CD store from a store-based CD instruction 202 resulting from an incorrect, predicted instruction control flow path taken ("CD predicted path 204"). An instruction stream 200 is a collection of instructions that are processed in a processor based on an instruction set or listing of computer instructions loaded into the processor. The CD store from the store-based CD instruction 202 is forwarded to a memory-dependent CI load in a load-based CI instruction 206 when the predicted instruction control flow path is taken. Thus, as discussed below, the load-based CI instruction 206 has a store-forward dependency on the store-based CD instruction 202 when the predicted instruction control flow path is taken. A store-forward data dependency or "store-forward dependency" (SFD) is a dependency that exists when a produced store from a store-based instruction is forwarded in an instruction pipeline as a consumed load in a load-based instruction. The instruction stream 200 in FIG. 2A includes a conditional branch instruction 208 that is evaluated by a processor executing instructions in the instruction stream 200. A processor can be configured to predict the outcome of the conditional branch instruction 208 before the condition or predicate of the conditional branch instruction 208 is fully evaluated in an execution of the conditional branch instruction 208 to avoid delays in an instruction pipeline. FIG. 2A illustrates a prediction of the evaluation of the conditional branch instruction 208 resulting in the branch taken. Instructions in the instruction stream 200 that are processed in an instruction control flow path as a result of the branch taken are CD instructions, meaning that the control of their processing is dependent on the prediction of evaluation results of the conditional branch instruction 208. Instructions in the instruction stream 200 that are processed in an instruction control flow path regardless of the branch taken are CI instructions, meaning that the control in their processing is not dependent on the prediction of the evaluation results of the conditional branch instruction 208.

In the example in FIG. 2A, the branch taken path of the instruction stream 200 is the CD predicted path 204 that includes CD instructions 210 in a CD instruction region 211 including the store-based CD instruction 202. The store-based CD instruction 202 is a CD instruction, because its insertion in the instruction stream 200 to be executed by a processor is dependent on the evaluation results of the conditional branch instruction 208. In this example, the store-based CD instruction 202 stores data in register 'X' in memory location at register [A]. There are instructions in the instruction stream 200 that follow later from the CD instructions 210 in the CD predicted path 204 that are CI instructions 212 in a CI instruction region 213 in a CI instructions flow path 214 ("CI path 214"). The CI instructions 212 include the load-based CI instruction 206 that loads data from a memory location at the address in register [A] into register 'Y'. However, if registers 'A' and 'B' have the same value, this means that the value in register 'X' will be stored in register 'Y' when load-based CI instruction 206 is executed creating a memory data dependency between the load-based CIRDI instruction 206, as a CIMDD instruction, and store-based CD instruction 202. A processor may be able to recognize the memory dependency between the load-based CIRDI instruction 206 as a CIMDD instruction, and the store-based CD instruction 202 and forward the store results in register 'X' directly to register 'Y' as the target of the load-based CI instruction 206 before the store result of store-based CD instruction 202 is committed (i.e., written) to memory location [A]. Since the store-based CD instruction 202 in the CD predicted path 204 calls for the storing the value in register 'X' to memory location [A], and the source of the load of the load-based CIRDI instruction 206 is memory location [A], 'Y' will eventually become the value of 'X' when the store-based CD instruction 202 and load-based CIRDI instruction 206 are executed. Thus, the load-based CIRDI instruction 206 is considered a CIMDD instruction being memory data dependent on the store produced by the store-based CD instruction 202, which is a CD instruction 210.

However, as shown in instruction stream 216 in FIG. 2B, if during execution of the conditional branch instruction 208, it is determined that the condition of the conditional branch instruction 208 is actually evaluated to the not taken instruction control flow path 218 as the actual path ("CD actual path 218"), this means a misprediction occurred earlier when the condition of the conditional branch instruction 208 was predicted to be taken. Instruction stream 216 will then be executed by a processor in a misprediction recovery with the not taken, actual instruction control flow path 218 being executed. Thus, the instructions in the not taken, actual instruction control flow path 218 are also CD instructions in that they are control dependent on the outcome of the conditional branch instruction 208. As shown in FIG. 2B, the same load-based CIRDI instruction 206 is present in the CI path 214, because the CI path 214 includes CI instructions 212 that are executed regardless of the outcome of the conditional branch instruction 208 evaluation. However, in this example, the store-based CD instruction 202 present in the CD instructions 210 in the CD predicted path 204 in FIG. 2A is not present in the CD instructions in the actual instruction control flow path 218 in FIG. 2B. Thus, the store-based CD instruction 202 is effectively "removed" in misprediction recovery such that the previously stored 'X' data is still stored in memory location [A], but yet would not have been stored but for the CD instructions 210 in incorrect, CD predicted path 204 being previously taken and processed from the instruction stream 200. This results in an illegal forwarding of memory location [A] to the load-based CIRDI instruction 206.

A CI instruction can also have a data dependency with an intermediate store-based CI instruction that also has a memory dependency with a store-based CD instruction. This can result in an illegal forwarding of data to the load-based CI instruction. In this regard, FIG. 3A is an instruction stream 300 in flowchart form illustrating a CD store from a store-based CD instruction 302 resulting from an incorrect, predicted instruction control flow path taken ("CD predicted path 304"), which is forwarded to a memory-dependent CI store in a store-based CI instruction 306. The instruction stream 300 in FIG. 3A includes a conditional branch instruction 308. The branch taken path of the instruction stream 300 is the CD predicted path 304 that includes CD instructions 310 in a CD instruction region 311 including the store-based CD instruction 302. In this example, the store-based CD instruction 302 stores the result of the value stored in register A incremented by 1 (i.e. 'A+1') into register A. CI instructions 312 in a CI instruction control flow path 314 ("CI path 314") in a CI instruction region 313 include the store-based CI instruction 306 that stores 'X' to memory location at register [A] dependent on the store operation in store-based CD instruction 302 of 'A=A+1'. Load-based CI instruction 316 loads the data in memory location [B] to 'Y'. Load-based CIRDI instruction 318 loads the data in register 'Y' into register 'Z.' Thus, if the value stored in register [A] is equal to the value stored in register B (i.e. A=B), this results in a store-to-load forwarding of 'X' to 'Y', which is then stored in register 'Z' by the load-based CIRDI instruction 318. This causes a memory dependence to exist between the load-based CI instruction 316 and load-based CIRDI instruction 318, and store-based CD instruction 302.

Thus, in this example, the load-based CI instruction 316 is a CIMDD instruction based on its dependency with store-based CI instruction 306, which is dependent on store-based CD instruction 302. Load-based CIRDI instruction 318 is a CIMDD instruction based on its dependency with load-based CI instruction 316, which is indirectly dependent on store-based CD instruction 302. Thus, the load-based CIRDI instruction 318 in the CI path 314 is a load-based CIMDD instruction that is affected by the outcome of the evaluation of the conditional branch instruction 308.

FIG. 3B illustrates the instruction stream 317 taken in misprediction recovery as a result of the CD predicted path 304 in FIG. 3A being mispredicted and taken previously. As shown in instruction stream 317 in FIG. 3B, if during execution of the conditional branch instruction 308 it is determined that the condition of the conditional branch instruction 308 is actually evaluated to the not taken CD instruction control flow path 320 as the CD actual path ("CD actual path 320"), this means a misprediction occurred earlier when the condition of the conditional branch instruction 308 was predicted to be taken. Instruction stream 317 will then be executed by the processor in a misprediction recovery with the not taken path, CD actual instruction control flow path 320 being executed. As shown in FIG. 3B, the same store-based CI instruction 306 and load-based CI and CIRDI instructions 316, 318 are present in the CI path 314, because the CI path 314 includes the CI instructions 312 that are executed regardless of the outcome of the conditional branch instruction 308 evaluation.

In this example, the store-based CD instruction 302 present in the CD instructions 310 in the CD predicted path 304 in FIG. 3A is not present in CD instructions 322 in a CD instruction region 323 in the not taken path, CD actual instruction control flow path 320 in FIG. 3B. Thus, the store-based CD instruction 302 is effectively "removed" in misprediction recovery such that the produced store data of 'A+1' is still stored in 'A', but yet would not have been stored but for the CD instructions 310 in incorrect, CD predicted path 304 being previously taken and processed from the instruction stream 300. This results in 'X' in load-based DI instruction 306 in misprediction recovery being stored at memory location [A] causing B=A such that the load-based CIRDI instruction 318 stores the value at memory location [A] in register 'Z,' when 'B' should not be equal to 'A.' The load-based CIRDI instruction 318 should instead store the value in memory location [B] that is not necessarily equal to the value in memory location [A] when the CD actual instruction control flow path 320 is the correct instruction flow path.

Thus, in each of the examples in FIGS. 2A-2B and 3A-3B above, a load-based CI instruction was present in the instruction streams 200, 300 was a CIMDD instruction as having a store-forward memory dependency on a CD instruction in a taken mispredicted instruction flow path. The load-based CIRDI instruction 318 could have been identified as CIMDD when processed previously in the instruction stream 300 in FIG. 3A so that the load-based CIRDI instruction 318 was replayed in misprediction recovery as part of the instruction stream 317 in FIG. 3B. However, as discussed above, it may not have been possible to previously detect the load-based CIRDI instruction 318 as a CIMDD instruction in pre-execution processing such that the load-based CIRDI instruction 318 is replayed in misprediction recovery without classifying all load-based CIRDI instructions in the CI path 314 as CIMDD instructions. All load-based CIRDI instructions, such as load-based CIRDI instruction 318, and their dependent instructions could be classified as CIMDD instructions for replay in misprediction recovery. In this scenario, the instruction pipeline would be flushed, and all load-based CIRDI instructions would be replayed in misprediction recovery to avoid the various illegal load scenarios. However, this can result in execution delay in the instruction pipeline and increased power consumption, because not all the load-based CIRDI instructions are actually CIMDD instructions. For example, some of these load-based CIRDI instructions may not have a memory data dependency on a CD instruction, and thus are truly CIDI instructions that do not have to be replayed in misprediction recovery. Further, tracking all the dependent instructions of the load-based CIRDI instruction 318 for example that cannot be guaranteed to be a CIMDD instruction until execution can stress the replay structures in a processor used for misprediction recovery, and can limit the speculation window depth or the effectiveness of the employed CI recovery techniques.

In this regard, a processor can be configured to predict store-forward dependencies for load-based CI instructions, including load-based CIRDI instructions, and selectively designate such store-forward dependent load-based CI instructions as CIMDD instructions for replay in speculative misprediction recovery. In this regard, FIGS. 4A and 4B illustrate exemplary instruction streams 400, 402, respectively, in flowchart form that illustrate predicting store-forward memory dependencies between stores and CI loads in load-based CIRDI instructions in a CI instruction stream. The prediction of store-forward memory dependencies follow a predicted, incorrect CD instruction control flow path ("CD predicted path 404") taken from a conditional control instruction 406, such as a conditional branch instruction, and an actual, correct CD instruction control flow path 408 ("CD actual path 408") taken during misprediction recovery. The instruction stream 400 in FIG. 4A includes pre-branch instructions 410 in a CI instruction region 412 in a pre-branch instruction control flow path 414 ("pre-branch path 414") before the conditional control instruction 406 is reached in the instruction stream 400. Thus, the pre-branch instructions 410 are CI instructions. The pre-branch instructions 410 include a store-based CI instruction 416 that stores the value in register 'W' into memory location [B]. Then, as shown in FIG. 4A, the instruction stream 400 includes CD instructions 418 in a CD instruction region 420 in the CD predicted path 404 as a result of predicting the condition in the conditional control instruction 406 as resulting in branch taken. The CD predicted path 404 includes store-based CD instruction 422 that stores the value of register 'X' into memory location [A]. As also shown in FIG. 4A, the instruction stream 400 includes CI instructions 424 in a CI instruction region 426 in a CI instruction control flow path 428 ("CI path 428") that is executed regardless of the predicted or evaluated result of the condition in the conditional control instruction 406. The CI instructions 424 include a load-based CI instruction 430 that loads the data in memory location [A] into register 'Z'. The CI instructions 424 also include a load-based CIRDI instruction 432 that loads the data in register 'Z' stored by load-based CI instruction 430 into register 'Y'. Thus, the load-based CIRDI instructions 430, 432 are store-forward dependent on the CI stores to registers produced by store-based CI instruction 416 in the pre-branch path 414. Load-based CIRDI instruction 430 is a load-based CIMDD instruction because of its source memory address forwarded by store-based CD instruction 422. Load-based CIRDI instruction 432 is a load-based CIMDD instruction because of its register dependency on load-based CI instruction 430, which has a memory dependency on store-based CD instruction 422.

In this regard, in the example illustrated in FIG. 4A, a processor can be configured to predict whether the load-based CIRDI instruction 432 in the CI path 428 has a store-forward memory dependency on a store-based instruction. In this example, load-based CIRDI instruction 432 has a store-forward register dependency on load-based CI instruction 430, which has a store-forward memory dependency on store-based CD instruction 422 when the CD predicted path 404 is taken. Thus, the load-based CIRDI instruction 432 is a CIMDD instruction. The processor can be configured to predict if the load-based CIRDI instruction 432 is a CIMDD instruction. Thus, if the CD predicted path 404 was determined to have been mispredicted when the condition of the conditional control instruction 406 is resolved at execution, and the actual CD instruction control flow path 408 in FIG. 4B is taken in misprediction recovery to execute instructions in a second CD instruction region 434, the processor can determine if any load-based CIRDI instructions in the instruction stream 402, including load-based CIRDI instruction 432, was designated as a CIMDD instruction. For any load-based CIRDI instructions designated as CIMDD instructions, the processor can be configured to replay (i.e., re-execute) such load-based CIRDI instructions in misprediction recovery when the actual CD instruction control flow path 408 is taken as shown in FIG. 4B so that the load-based CIRDI instructions are re-executed. In this example, the load-based CIRDI instruction 432 would be designated as a CIMDD instruction if predicted to have a store-forward memory dependency determined when the CD predicted path 404 is taken in FIG. 4A.

FIG. 5 is a schematic diagram of an exemplary processor-based system 500 that includes a processor 502. As discussed in more detail below, to avoid classifying all load-based CIRDI instructions as CIMDD instructions to be replayed in misprediction recovery, and because it is difficult to determine if a load-based CIRDI instruction is a CIMDD instruction, the processor 502 is configured to predict if a source of a load-based CIRDI instruction has a memory dependency forwarded by a store-based CD instruction, and thus is a CIMDD instruction. If a load-based CIRDI instruction is predicted as having a memory dependency on a store-based CD instruction and thus is CIMDD instruction, the load-based CIRDI instruction is considered as having a CIMDD characteristic as a load-based CIMDD instruction. All the instructions dependent on the load-based CIRDI instruction can also be considered having a CIMDD characteristic as CIMDD instructions. Such CIMDD instructions are replayed in the processor in misprediction recovery. In this manner, the processor 502 can avoid replaying all store-forward, load-based CIRDI instructions in misprediction recovery as CIMDD instructions. This can reduce misprediction recovery latency in the processor 502 while also still replaying load-based CIDI instruction that were predicted to be CIMDD instructions.

In this regard, with reference to FIG. 5, the processor 502 includes an instruction processing circuit 504. The processor 502 may be an in-order or an out-of-order processor (OoP) as an example. The instruction processing circuit 504 includes an instruction fetch circuit 508 that is configured to fetch instructions 506 from an instruction memory 510. The instruction memory 510 may be provided in or as part of a system memory in the processor-based system 500 as an example. An instruction cache 512 may also be provided in the processor 502 to cache the instructions 506 fetched from the instruction memory 510 to reduce latency in the instruction fetch circuit 508. The instruction fetch circuit 508 in this example is configured to provide the instructions 506 as fetched instructions 506F into one or more instruction pipelines $I_0$-$I_N$ as an instruction stream 514 in the instruction processing circuit 504 to be pre-processed, before the fetched instructions 506F reach an execution circuit 534 to be executed. The fetched instructions 506F in the instruction stream 514 include producer instructions and consumer instructions that consume produced values as a result of the instruction processing circuit 504 executing producer instructions. The instruction pipelines $I_0$-$I_N$ are provided across different processing circuits or stages of the instruction processing circuit 504 to pre-process and process the fetched instructions 506F in a series of steps that can be performed concurrently to increase throughput prior to execution of the fetched instructions 506F in the execution circuit 534. For example, fetched store-based instructions 506F identified as having store-forward loads in the instruction stream 514 can be identified by the instruction processing circuit 504 before being executed to be forwarded to be consumed by fetched consuming load-based instructions 506F.

A control flow prediction circuit 516 (e.g., a branch prediction circuit) is also provided in the instruction processing circuit 504 in the processor 502 in FIG. 5 to speculate or predict the outcome of a predicate of a fetched conditional control instruction 506F, such as a conditional branch instruction, that affects the instruction control flow path of the instruction stream 514 of the fetched instructions 506F processed in the instruction pipelines $I_0$-$I_N$. The prediction of the control flow prediction circuit 516 can be used by the instruction fetch circuit 508 to determine the next fetched instructions 506F to fetch based on the predicted target address. The instruction processing circuit 504 also includes an instruction decode circuit 518 configured to decode the fetched instructions 506F fetched by the instruction fetch circuit 508 into decoded instructions 506D to determine the instruction type and actions required, which may also be used to determine in which instruction pipeline $I_0$-$I_N$ the decoded instructions 506D should be placed. For example, the instruction fetch circuit 508 is configured to fetch CD instructions 506 in CD instruction regions following a conditional control instruction 506 and CI instructions 506 in a CI instruction region preceding or following the CD instruction regions. The decoded instructions 506D are placed in one or more of the instruction pipelines $I_0$-$I_N$ and are next provided to a rename circuit 520 in the instruction processing circuit 504. The rename circuit 520 is configured to determine if any register names in the decoded instructions 506D need to be renamed to break any register dependencies that would prevent parallel or out-of-order processing. The rename circuit 520 is configured to call upon a register map table (RMT) 522 to rename a logical source register operand and/or write a destination register operand of a decoded instruction 506D to available physical registers 524(1)-524(X) ($P_0$, $P_1$, . . . , $P_X$) in a physical register file (PRF) 526. The RMT 522 contains a plurality of mapping entries each mapped to (i.e., associated with) a respective logical register $R_0$-$R_P$. The mapping entries are configured to store information in the form of an address pointer to point to a physical register 524(1)-524(X) in the PRF 526. Each physical register 524(1)-524(X) in the PRF 526 contains a data entry configured to store data for the source and/or destination register operand of a decoded instruction 506D.

The instruction processing circuit 504 in the processor 502 in FIG. 5 also includes a register access circuit 528 ("RACC Circuit 528") prior to a dispatch circuit 530. The register access circuit 528 is configured to access a physical register 524(1)-524(X) in the PRF 526 based on a mapping entry mapped to a logical register $R_0$-$R_P$ in the RMT 522 of a source register operand of a decoded instruction 506D to retrieve a produced value from an executed instruction 506E in the execution circuit 534. The register access circuit 528 is also configured to provide the retrieved produced value from an executed decoded instruction 506E as the source register operand of a decoded instruction 506D to be executed. Also, in the instruction processing circuit 504, the dispatch circuit 530 is provided in the instruction pipeline $I_0$-$I_N$ and is configured to dispatch a decoded instruction 506D to the execution circuit 534 to be executed when all source register operands for the decoded instruction 506D are available. For example, the dispatch circuit 530 is responsible for making sure that the necessary values for operands of a decoded consumer instruction 506D are available before dispatching the decoded consumer instruction 506D to the execution circuit 534 for execution. The operands of a decoded instruction 506D can include immediate values, values stored in memory, and produced values from other decoded instructions 506D that would be considered producer instructions to the consumer instruction. The execution circuit 534 is configured to execute decoded instructions 506D received from the dispatch circuit 530. A write circuit 532 is also provided in the instruction processing circuit 504 to write back or commit produced values from executed instructions 506E to memory, such as the PRF 526, cache memory, or system memory.

As discussed above, the instruction stream 514 can have conditional control instructions whose predicates are speculatively predicted by the control flow prediction circuit 516. Such prediction is used to determine which branch is taken to process a particular CD instruction region to process in the instruction stream 514 in the instruction pipeline $I_0$-$I_N$ following the conditional control instruction. As discussed above, the CD instructions 506 in the predicted instruction control flow path are processed based on the prediction of the evaluation of predicate of the conditional control instruction 506. There are other CI instructions 506 in a CI instruction region(s) in the instruction stream 514 that are inserted in the instruction pipeline $I_0$-$I_N$ to get executed regardless of which instruction control flow path is taken as a result of predicting the outcome of the predicate of the conditional branch instruction 506. These instructions 506 are also known CI instructions 506. These CI instructions can be further classified based on their data dependence on CD in a CD region in the instruction stream 514. If for example, a load-based CIRDI instruction 506 is actually memory dependent on data stored in memory by a store-based CD instruction 506, the load-based CIRDI instruction 506 is a CIMDD instruction.

The instruction processing circuit 504 is configured to execute a conditional control instruction 506D in the instruction stream 514 in the execution circuit 534 that was speculatively predicted by the control flow prediction circuit 516 to resolve the predicate of the conditional control instruction 506D and determine if the speculative prediction matches the resolved predicate from execution of the conditional control instruction 506D. If it is determined by the instruction processing circuit 504 that a conditional control instruction 506 was mispredicted when the predicate of the conditional control instruction 506 is resolved at execution by the execution circuit 534, the instruction processing circuit 504 is configured to execute a misprediction recovery. In misprediction recovery, the instruction processing circuit 504 may be configured to replay the instructions 506 in the instruction stream 514 back to the conditional control instruction 506 while including the CD instructions in the actual, correct instruction control flow path from resolution of the conditional control instruction 506. Thus, load-based CIRDI instructions 506 that were processed or executed based on the speculative misprediction may have been based on stored CD data that was removed and/or other stored CD data added. Also, as discussed above, load-based CIRDI instructions 506 that were processed or executed, even though not processed in an instruction flow path taken due to the speculative misprediction, may have a memory dependency on a load-based CD instruction 506 that was processed in an instruction flow path taken due to the speculative misprediction. Thus, such load-based CIRDI instructions 506 would be CIMDD instructions and also should be replayed in misprediction recovery.

To address the issue of load-based CIRDI instructions 506 having been executed that have a memory dependency based on later removed CD data in misprediction recovery, the instruction processing circuit 504 in this example includes a control independence determination circuit 536 in this example. The control independence determination circuit 536 is configured to predict if a processed load-based CIRDI instruction 506D is a CIMDD instruction. The control independence determination circuit 536 includes a memory dependence predictor circuit 538 that is configured to predict if the load-based CIRDI instruction 506D is store-forward memory dependent on a store-based CD instruction 506D in the instruction stream 514. The control independence determination circuit 536 is configured to designate the load-based CIRDI instruction 506D as CIMDD instruction if the load-based CIRDI instruction 506D was predicted by the memory dependence predictor circuit 538 to be a CIMDD instruction. The load-based CIRDI instruction 506D is executed in the instruction processing circuit 504 independent of the control flow of the resolution of the conditional control instruction 506D. If the execution circuit 534 determines during execution of the conditional control instruction 506D that the speculative prediction by the control flow prediction circuit 516 did not match the resolved predicate in execution of the conditional control instruction 506D, the instruction processing circuit 504 is configured to process the fetched instructions 506F in a second CD instruction region in the instruction stream 514 taken based on the resolved predicate from execution of the conditional control instruction 506D in misprediction recovery. If the load-based CIRDI instruction 506D was designated as having been predicted as a CIMDD instruction, the execution circuit 534 will replay (i.e., re-execute) the processed load-based CIRDI instruction 506D in misprediction recovery. Replaying a decoded instruction 506D means to execute the decoded instruction 506D that was previously processed in the instruction processing circuit 504 and/or executed.

However, if the load-based CIRDI instruction 506D is not predicted to be a CIMDD instruction on the store-based instruction, the execution circuit 534 may not replay and re-execute the processed load-based CIRDI instruction 506D. A load-based CIRDI instruction 506D not predicted as a CIMDD instruction does not necessarily mean that the load-based CIRDI instruction 506D is not actually dependent on a store-based CD instruction 506D. The determination of whether the load-based CIRDI instruction 506D is actually dependent on a store-based CD instruction 506D can be determined from execution of load-based CIRDI instruction 506D in the execution circuit 534. Thus, in this instance, as discussed in more detail below, the processor 502 can consider a non-CIMDD predicted load-based CIRDI instruction 506D as a pending load-based CIRDI instruction 506D. If this pending load-based CIRDI instruction 506D is then determined to be dependent on a forwarded store from a store-based CD instruction in execution, the processor 502 can issue a pipeline flush event 540 as shown in FIG. 5 to cause the relevant instruction pipeline $I_0$-$I_N$ to be flushed and the instruction fetch circuit to re-fetch instructions 506 to be processed and executed. The re-fetched instructions 506 will include the pending load-based CIRDI instruction 506D. Thus, pending load-based CIRDI instruction 506D will be replayed in misprediction recovery. If, however, this pending load-based CIRDI instruction 506D was not determined to be memory dependent on a forwarded store from a store-based CD instruction in the execution circuit 534, the pipeline flush event 540 will not be generated as a result, and the pending load-based CIRDI instruction 506D will not be replayed in misprediction recovery as not memory dependent on a CD instruction, and thus not a CIMDD instruction. Not replaying indiscriminately all load-based CIRDI instructions in misprediction recovery can reduce misprediction recovery delay by not re-executing CIDI instructions in the instruction stream 514 whose load data will not change based on the misprediction recovery, thus reduces power consumption as a result.

To further illustrate exemplary operation of the instruction processing circuit 504 in the processor 502 in FIG. 5 predicting if load-based CIRDI instructions 506D are CIMDD instructions to be designated to be replayed in misprediction recovery, FIG. 6 is provided. FIG. 6 is a flowchart illustrating an exemplary process 600 of a processor, such as the processor 502 in FIG. 5, tracking and predicting if load-based CIRDI instructions in an instruction stream have a store-forward memory dependency on a store-based CD instruction, and are thus CIMDD instructions for replay in misprediction recovery. The process 600 in FIG. 6 is discussed with example to the processor 502 in FIG. 6.

In this regard, as illustrated in FIG. 6, the process 600 includes the instruction fetch circuit 508 of the instruction processing circuit 504 fetching a plurality of instructions 506 from a memory 510 and/or instruction cache 512 into an instruction pipeline $I_0$-$I_N$ among the one or more instruction pipelines $I_0$-$I_N$, the plurality of fetched instructions 506F in the one or more instruction pipelines $I_0$-$I_N$ comprising an instruction stream 514 comprising at least one CI instruction region and a plurality of CD instruction regions (block 602). The process 600 also includes the instruction processing circuit 504 speculatively predicting a predicate in a conditional control instruction 506F in the instruction stream 514 (block 604). The process 600 also includes the instruction processing circuit 504 processing fetched instructions 506F in the instruction stream 514 comprising fetched instructions 506F in a first CD instruction region among the plurality of CD instruction regions in the instruction stream 514 taken based on the speculative prediction (block 606). The process 600 also includes the control independence determination circuit 536 and its memory dependence predictor circuit 538 predicting if the load-based CIRDI instruction 506D is a CIMDD instruction based on predicting if a store-based CD instruction 506D designated a forward store for consumption by the load-based CIRDI instruction 506D (block 608). In response to the load-based CIRDI instruction 506D being predicted as a CIMDD instruction, designate the load-based CIRDI instruction 506D as a CIMDD instruction (block 610).

The process 600 also includes the execution circuit 534 in the instruction processing circuit 504 executing the conditional control instruction 506D to resolve the predicate of the conditional control instruction 506D to resolve the predicate of the conditional control instruction 506D (block 612). The process 600 also includes the execution circuit 534 in the instruction processing circuit 504 determining if the speculative prediction matches the resolved predicate from execution of the conditional control instruction 506D (block 614). In response to the speculative prediction not matching the resolved predicate in execution of the conditional control instruction 506D (block 616), the instruction processing circuit 504 generates a pipeline flush event 540 (block 616). In response to the pipeline flush event 540, the instruction processing circuit 504 processes the fetched instructions 506F in a second CD instruction region among the plurality of CD instruction regions in the instruction stream 514 taken based on the resolved predicate from execution of the conditional control instruction 506D and the load-based CI instruction 506D (block 618). Also in response to the pipeline flush event 540, the instruction processing circuit 504, in response to the load-based CIRDI instruction 506D being designated as a CIMDD instruction, the instruction processing circuit 504 is also configured to replay the processed load-based CIRDI instruction 506D (block 620).

FIG. 7 is a schematic diagram illustrating exemplary details of the control independence determination circuit 536 and load memory dependence determination circuit 700 in the processor 502 in FIG. 5. In this example, the control independence determination circuit 536 includes the load memory dependence determination circuit 700 and a memory dependence (MD) tracking circuit 702. The MD tracking circuit 702 is configured to store one or more MD entries each comprising MD information for a load-based instruction designated as a CIMDD instruction based on a prediction by the memory dependence predictor circuit 538. The MD tracking circuit 702 is updated and consulted by the memory dependence predictor circuit 538 based on processed load-based CI instructions in the instruction stream 514 in the processor 502 in FIG. 5 to determine if a load-based CI instruction is store-forward dependent on a CD instruction.

The load memory dependence determination circuit 700 is configured to consult memory dependence predictor circuit 538 to determine if a load-based CIRDI instruction 506 is predicted as having a store-forward memory data dependence. As discussed above, the memory dependence predictor circuit 538 is configured to predict if a load-based CIRDI instruction 506 should be designated as a CIMDD instruction for replay. In this example, the memory dependence predictor circuit 538 is configured to receive an instruction identifier (ID) 706 from the load memory dependence determination circuit 700 identifying a load-based instruction 506D in the instruction stream 514. The memory dependence predictor circuit 538 may also be configured to receive an instruction ID 704 identifying a conditional control instruction 506 determined by the execution circuit 534 to have been mispredicted in the instruction processing circuit 504, and thus instructions 506 in the instruction stream 514 having been processed in a CD instruction region based on an incorrect, predicated instruction control flow path. The memory dependence predictor circuit 538 is configured to provide a memory data dependence (MDD) prediction state 720 to the load memory dependence determination circuit 700 indicating if the load-based CIRDI instruction 506 is predicted as having a memory data dependence. The load memory dependence determination circuit 700 is configured to output CIMDD information 710 indicating to the execution circuit 534 if a load-based CIRDI instruction 506D is predicted as having an MDD based on the MDD prediction state 720, to designate the load-based CIRDI instruction 506D as CIMDD if predicted to have an MDD. This so that the execution circuit 534 will replay such load-based CIRDI instruction 506D in misprediction recovery. The load memory dependence determination circuit 700 may also be configured to receive mispredicted instruction information 708 about the mispredicted load-based CIRDI instructions 506D for training of predictions as will be discussed in more detail below.

With continuing reference to FIG. 7, the load memory dependence determination circuit 700 is configured to consult the MD tracking circuit 702 to establish SFL entries for received load IDs for tracking load-based CIRDI instructions 506 designated as CIMDD instructions. The MD tracking circuit 702 is configured to receive memory data dependency (MDD) information 714 from a store-to-load (STL) forwarding circuit 716 as part of the instruction processing circuit 504 to provide store forwarding information about load-based CIRDI instructions 506 to update the tracking information in the MD tracking circuit 702 as will be described below.

In this regard, FIG. 8 illustrates an example of a MDD tracking memory 800 that is contained in or part of the MD tracking circuit 702 in FIG. 7 to track corresponding load-based CI instructions to determine if the load-based CI instructions are SFD on store-based instructions. In this example, the MDD tracking memory 800 is configured to store a plurality of memory data dependency (MDD) entries 802(0)-802(N) each configured to store a load ID indicator 804 for storing a load ID instruction, a memory data dependency (MDD) indicator 806 for storing a state indicating if a load-based CIRDI instruction 506 is predicted to consume a store forward load produced by the store-based CD instruction 506, and a forward store indicator (FSID) 808 for storing a store ID of the store-based CD instruction 506 that the load-based CIRDI instruction is store-forward dependent upon. For example, as shown in MDD entry 802(0) in the MDD tracking memory 800, load ID '15' is stored in load ID indicator 804 to identify a load-based CIRDI instruction 506. The MDD indicator 806 being '1' in MDD entry 802(0) indicates an MDD prediction state as MDD, meaning that the load-based CI instruction of load ID '15' was predicted as a CIMDD instruction. The store ID identifying the store-based CD instruction that the load-based CIRDI instruction in the MDD entry 802(0) is memory dependent on, is in the FSID 808 in MDD entry 802(0), which is store ID '1'. A '0' entry in the MDD indicator 806 in this example indicates an SFL false state, meaning that the load-based CIRDI instruction identified by the load ID in the load ID indicator 804 of an MDD entry 802(0)-802(N) was not predicted to be memory dependent on a store-based CD instruction 506.

In the example of the MD tracking circuit 702 in FIG. 7, the MD tracking circuit 702 is configured to store load instruction IDs 704 of load-based CI instructions 506 in MDD entries 802(0)-802(N) in an out-of-order fashion. In this example, all load-based CIRDI instructions 506 in a CI instruction region will be communicated as MDD information 714 from the STL forwarding circuit 716 to the MD tracking circuit 702. The MD tracking circuit 702 will establish a new MDD entry 802(0)-802(N) in the MDD tracking memory 800 in response to execution of the any instructions that produce CI loads to be consumed by load-based CIRDI instructions 506. The SFL state and the FSID for the load-based CIRDI instruction 506 is provided to the MD tracking circuit 702 at the execution time of the load-based CIRDI instruction 706 by the STL forwarding circuit 716. When a CI load generated by a store-based CD instruction 706 becomes non-speculative, the MDD entry 802(0)-802(N) in the MDD tracking memory 800 with the load ID identifying the load-based instruction that is memory dependent on the CI load can be de-allocated and such MDD entry 802(0)-802(N) freed for another entry.

With reference to FIG. 7, the load memory dependence determination circuit 700 is configured to determine from the memory dependence predictor circuit 538 if the load-based CIRDI instruction 506 is predicted as memory dependent on a load-based CD instruction. In response to the memory dependence predictor circuit 538 predicting that the load-based CIRDI instruction 506 is memory dependent on a load-based CD instruction, the load memory dependence determination circuit 700 is configured to store MDD information 714 in an MDD entry 802(0)-802(N) designating the load-based CIRDI instruction 506 as a load-based CIMDD instruction. The load memory dependence determination circuit 700 is configured to indicate if a load-based CIRDI instruction 506 is a load-based CIMDD instruction to the execution circuit 534 through the CIMDD information 710 or the list of CIMDD instructions 712. If the execution circuit 534 determines that the speculative prediction for an executed conditional control instruction 506 does not match the resolved predicate, the execution circuit 534 is configured to determine if an executed load-based CIRDI instruction 506 is designated as a CIMDD instruction based on the MDD information 714 in the MDD entry 802(0)-802(N) corresponding to the load-based CI instruction 506 in the MD tracking circuit 702. The memory dependence predictor circuit 538 is configured to designate the load-based CIRDI instruction 506 as a load-based CIMDD instruction by receiving updated MDD information 714 from the STL forwarding circuit 716 to designate a load-based CI instruction having memory dependence on a store-based CD instruction as a load-based CIMDD instruction. The execution circuit 534 can then mark the load-based CIRDI instruction 506 designated as a CIMDD instruction for replay during misprediction recovery.

Note that the memory dependence predictor circuit 538 may make an incorrect prediction of memory data dependence of a load-based CIRDI instruction 506. For example, the memory dependence predictor circuit 538 may predict that a load-based CIRDI instruction 506 has a memory data dependence processed before execution, but is determined to not have a memory data dependence after being executed in the execution circuit 534. Thus, in this case, the load-based CIRDI instruction 506 will have been designated as a CIMDD instruction for replay when in actuality, such load-based CIRDI instruction 506 does not need to be replayed in misprediction recovery. Also, the memory dependence predictor circuit 538 may predict that a load-based CIRDI instruction 506 does not have a memory data dependence when processed before execution, but is determined to actually have a memory data dependence after being executed in the execution circuit 534. Thus, in this case, the load-based CIRDI instruction 506 will not have been designated as a CIMDD instruction for replay when in actuality, such load-based CIRDI instruction 506 need to be replayed in misprediction recovery. Thus, the load memory dependence determination circuit 700 in FIG. 7 can be configured to recover from an incorrect MDD prediction.

In this regard, if the memory dependence predictor circuit 538 does not predict a load-based CIRDI instruction 506 as having a memory data dependence and thus is not a CIMDD instruction, the load memory dependence determination circuit 700 can be configured to designate such load-based CIRDI instruction 506 as a pending load-based CIRDI instruction. The load memory dependence determination circuit 700 can designate the pending load-based CIRDI instruction 506 using the MDD tracking memory 800 for example. This is so that this load-based CIRDI instruction 506 can be tracked to execution to determine if the load-based CIRDI instruction 506 actually has a memory data dependence and thus should be designated for replay in misprediction recovery. In this example, the execution circuit 534 will execute the load-based CIRDI instruction 506. The execution circuit 534 will then determine if the executed load-based CIRDI instruction 506 consumes a forward store from a store-based CD instruction. In response to the executed load-based CIRDI instruction 506 being designated as a pending load-based CIRDI instruction, and determining the executed load-based CIRDI instruction 506 determined to consume a forward store from a store-based CD instruction, the load memory dependence determination circuit 700 can be configured to still designate the load-based CIRDI instruction 506 as a CIMDD instruction for replay. The execution circuit 534 can then generate the pipeline flush event 540 to cause the relevant instruction pipeline $I_0$-$I_N$ to be flushed and the instruction fetch circuit 508 to re-fetch CD instructions 506 and the load-based CIRDI instruction 506, to be re-processed and replayed in misprediction recovery. If however, the execution circuit 534 determines that the load-based CIRDI instruction 506 is predicted to not have a memory data dependence and is also actually determined not to consume a forward store from a store-based CD instruction, the load memory dependence determination circuit 700 does not designate and/or maintains such load-based CIRDI instruction 506 not being designated as a CIMDD instruction. Such load-based CIRDI instruction 506 will not need to be replayed if a misprediction is determined and a misprediction recovery is performed.

If however, the memory dependence predictor circuit 538 does predict a load-based CIRDI instruction 506 as having a memory data dependence and thus is CIMDD instruction, the load memory dependence determination circuit 700 can designate such load-based CIRDI instruction 506 as a CIMDD instruction. This is so that load-based CIRDI instruction 506 will be replayed in misprediction recovery. In this example, the execution circuit 534 will execute the load-based CIRDI instruction 506. The execution circuit 534 will then determine if the executed load-based CIRDI instruction 506 actually consumes a forward store from a store-based CD instruction as being memory data dependent. In response to determining the executed load-based CIRDI instruction 506 actually consumes a forward store from a store-based CD instruction, the load memory dependence determination circuit 700 maintains such load-based CIRDI instruction 506 being designated as a CIMDD instruction. If, however, in response to determining the executed load-based CIRDI instruction 506 does not actually consume a forward store from a store-based CD instruction, the load memory dependence determination circuit 700 does not have to un-designate such a load-based CIRDI instruction 506 from being a CIMDD instruction. The load-based CIRDI instruction 506 can be maintained being designated as a CIMDD instruction that will be replayed in misprediction recovery. Alternatively, the load memory dependence determination circuit 700 can re-designate the load-based CIRDI instruction 506 as not being a CIMDD instruction, so that such load-based CIRDI instruction 506 is not replayed if executed before a misprediction recovery is performed.

FIG. 9 is an exemplary memory dependence predictor circuit 538 that can be provided in the control independence determination circuit 536 in FIGS. 5 and 7, to predict store-forward memory dependencies for CI loads in load-based CIRDI instructions 506 in the processor 502 in FIG. 5. As shown in FIG. 9, the memory dependence predictor circuit 538 is a table circuit 900 in this example that includes storage circuits configured to store data. The memory dependence predictor circuit 538 includes a plurality of prediction entries 902(0)-902(X) each indexable by the instruction ID 704. The prediction entries 902(0)-902(X) each include a respective MDD prediction indicator 904(0)-904(X) configured to store an MDD indication 906(0)-906(X) indicating a prediction of a forward store consumption from a store-based CD instruction 506 identifying a CIMDD characteristic. For example, an MDD indication 906(0)-906(X) of value '0' could mean no memory data dependence and a value of '1' could mean a memory data dependence. In this example, prediction entry 902(0)-902(X) also includes a tag indicator 908(0)-908(X) configured to store a respective tag 910(0)-910(X).

When the memory dependence predictor circuit 538 is called upon to make a CIMDD prediction for a load-based CIRDI instruction 506, the instruction ID 704 of the load-based CIRDI instruction 506 is passed to the memory dependence predictor circuit 538. The memory dependence predictor circuit 538 compares the instruction ID 704 or a value based on the instruction ID 704 (e.g., a hash value of the instruction ID 704) to the tags 910(0)-910(X) in the respective tag indicators 908(0)-908(X) of the prediction entries 902(0)-902(X). If a tag 910(0)-910(X) in a prediction entry 902(0)-902(X) matches the instruction ID 704 (or related value) for the load-based CIRDI instruction 506, the memory dependence predictor circuit 538 uses the MDD indication 906(0)-906(X) in the MDD prediction indicator 904(0)-904(X) of the associated prediction entry 902(0)-902(X) as the MDD prediction state for the load-based CIRDI instruction 506. This prediction of memory data dependence for the load-based CIRDI instruction 506 is provided as the MDD prediction state 720 to the control independence determination circuit 536. If the instruction ID 704 (e.g., a hash value of the instruction ID 704) does not match a tags 910(0)-910(X) in a tag indicator 908(0)-908(X) in any prediction entries 902(0)-902(X) in the memory dependence predictor circuit 538, the load memory dependence determination circuit 700 can be configured to use a default prediction, such as always MDD or never MDD, as an example.

As another example, the MDD prediction indicator 904(0)-904(X) of the prediction entries 902(0)-902(X) in the memory dependence predictor circuit 538 can be provided as a more sophisticated mechanism than a fixed MDD prediction state as either MDD or not MDD to allow for training over time based on the confidence of past MDD predictions. For example, the MDD prediction indicator 904(0)-904(X) of the prediction entries 902(0)-902(X) in the memory dependence predictor circuit 538 can be provided as counters. As discussed below, an MDD indication 906(0)-906(X) stored in an MDD prediction indicator 904(0)-904(X) can be an MDD prediction count that is used to determine an MDD prediction state for a load-based CIRDI instruction 506. For example, if an MDD prediction count stored in an MDD prediction indicator 904(0)-904(X) indexed by an instruction ID 704 for an associated load-based CIRDI instruction 506 exceeds a defined threshold count value, this may be an indication that the associated load-based CIRDI instruction 506 is to be predicted as having an MDD and thus not a CIMDD instruction. As another example, if an MDD prediction count stored in an MDD prediction indicator 904(0)-904(X) indexed by an instruction ID 704 for an associated load-based CIRDI instruction 506 does not exceed a defined threshold count value, this may be an indication that the associated load-based CIRDI instruction 506 is to be predicted as not having an MDD and thus not a CIMDD instruction. In other words, the MDD prediction count stored in an MDD prediction indicator 904(0)-904(X) as an MDD indication 906(0)-906(X) can be used to determine a relative confidence level of the MDD prediction state of a load-based CIRDI instruction 506.

The MDD indications 906(0)-906(X) of the MDD prediction indicator 904(0)-904(X) of the prediction entries 902(0)-902(X) in the memory dependence predictor circuit 538 can be initialized for making MDD predictions. For example, the MDD indications 906(0)-906(X) can be established in an MDD prediction indicator 904(0)-904(X) of a prediction entry 902(0)-902(X) as default settings, such as a fixed MDD or fixed not MDD. In another example, the MDD indications 906(0)-906(X) of the MDD prediction indicator 904(0)-904(X) of the prediction entries 902(0)-902(X) in the memory dependence predictor circuit 538 can also be trained during operation of the processor 502 based on the history of prediction accuracy. So for example, if the MDD prediction indicators 904(0)-904(X) of the prediction entries 902(0)-902(X) in the memory dependence predictor circuit 538 are MDD prediction counters, the MDD prediction count value stored in the MDD prediction indicators 904(0)-904(X) of the prediction entries 902(0)-902(X) can be adjusted over time as the processor 502 operates and executes load-based instructions 506 thus resolving if there is an actual memory data dependency. This can increase the prediction accuracy of MDD predictions made by the memory dependence predictor circuit 538 for load-based CIRDI instructions 506.

In this regard, as shown in FIG. 9, the memory dependence predictor circuit 538 is configured to receive a training indicator 912. The training indicator 912 indicates a training of an MDD indication 906(0)-906(X) of an MDD prediction indicator 904(0)-904(X) in a prediction entry 902(0)-902(X) based on resolved memory data dependency for a load-based CI instruction 506 when executed. For example, the training indicator 912 indexes an MDD prediction indicator 904(0)-904(X) in a particular prediction entry 902(0)-902(X) based on an indexing of the memory dependence predictor circuit 538 based on the received instruction ID 704. Thus for example, when the execution circuit 534 executes a load-based CI instruction 506, and a memory data dependence is resolved, the execution circuit 534 can be configured to communicate this resolution and instruction ID 704 to be received by the memory dependence predictor circuit 538. The memory dependence predictor circuit 538 can then train the MDD prediction indicator 904(0)-904(X) in a particular prediction entry 902(0)-902(X) based on an indexing of the memory dependence predictor circuit 538 based on the received instruction ID 704. For example, if an executed load-based CI instruction 506 is resolved as having an MDD, the MDD indication 906(0)-906(X) of the MDD prediction indicator 904(0)-904(X) of the indexed prediction entry 902(0)-902(X) can be updated to increase the confidence of the MDD prediction state. If an executed load-based CI instruction 506 is resolved as not having an MDD, the MDD indication 906(0)-906(X) of the MDD prediction indicator 904(0)-904(X) of the indexed prediction entry 902(0)-902(X) can be updated to decrease the confidence of the MDD prediction state. For example, if the MDD indication 906(0)-906(X) of the MDD prediction indicator 904(0)-904(X) is an MDD prediction counter, the MDD indications 906(0)-906(X) can be incremented or decremented based on the training.

For example, the memory dependence predictor circuit 538 can be configured to train the MDD indication 906(0)-906(X) of the MDD prediction indicator 904(0)-904(X) in the indexed prediction entry 902(0)-902(X) based on any load-based instruction 506 (i.e. any CD or CI load-based instruction) executed by the execution circuit 534. If the execution circuit 534 determines that the load-based instruction 506 is resolved to consume a forwarded store from a store-based CD instruction 506, the memory dependence predictor circuit 538 can update the MDD indication 906(0)-906(X) of the indexed MDD prediction indicator 904(0)-904(X) to increase the confidence of the MDD prediction state stored therein. The memory dependence predictor circuit 538 can also update the MDD indication 906(0)-906(X) of the indexed MDD prediction indicator 904(0)-904(X) to store an MDD prediction state therein if the MDD of the load-based instruction 506 is mispredicted to not be MDD. For example, this can involve increasing an MDD prediction count value of the indexed MDD prediction indicator 904(0)-904(X). If the execution circuit 534 determines that the load-based instruction 506 is resolved to not consume a forwarded store from a store-based CD instruction 506, the memory dependence predictor circuit 538 can update the MDD indication 906(0)-906(X) of the indexed MDD prediction indicator 904(0)-904(X) to decrease the confidence of the MDD prediction state stored therein. For example, this can involve decreasing an MDD prediction count value of the indexed MDD prediction indicator 904(0)-904(X). The memory dependence predictor circuit 538 can also update the MDD indication 906(0)-906(X) of the indexed MDD prediction indicator 904(0)-904(X) to store a non-MDD prediction state therein if the MDD of the load-based instruction 506 is mispredicted to be MDD.

In another example, the memory dependence predictor circuit 538 can be configured to train an MDD indication 906(0)-906(X) of an indexed MDD prediction indicator 904(0)-904(X) based only on load-based CIRDI instructions 506. In another example, the memory dependence predictor circuit 538 can be configured to train an MDD indication 906(0)-906(X) of an indexed MDD prediction indicator 904(0)-904(X) based only on load-based CIRDI instructions 506 in a CI instruction region from a conditional control instruction 506 and that are younger than such conditional control instruction 506. In another example, memory dependence predictor circuit 538 can be configured to train an MDD indication 906(0)-906(X) of an indexed MDD prediction indicator 904(0)-904(X) based on a load-based CIRDI instruction 506 being predicted as non-MDD and designated as pending load-based CIRDI instruction, but the load-based CIRDI instruction 506 is determined to actually consume a forward store from a store-based CD instruction 506 when executed. The memory dependence predictor circuit 538 can determine if the load-based CIRDI instructions 506 are younger than such conditional control instruction 506 based on the younger information 718 received by the load memory dependence determination circuit 700 as shown in FIG. 7.

FIG. 10 is a block diagram of an exemplary processor-based system 1000 that includes a processor 1002 configured to support selective designation of store-forward dependent load-based CI instructions in the CI instruction stream in an instruction pipeline in misprediction recovery as load-based CIRDI instructions for replay if the load-based CI instructions are identified as having a store-forward dependency. The processor 1002 includes a memory dependence predictor circuit 1004 that is configured to predict a store-forward dependence of load-based CIRDI instructions, and selectively designate such predicted store-forward load-based CIRDI instructions in the CI instruction stream as CIMDD instructions for replay in misprediction recovery. The processor 1002 can include, without limitation, the processor 502 in FIG. 5. The memory dependence predictor circuit can include, without limitation, the memory dependence predictor circuit 538 in FIGS. 5 and 7.

The processor-based system 1000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 1000 includes the processor 1002. The processor 1002 represents one or more general-purpose processing circuits, such as a microprocessor, central processing unit, or the like. The processor 1002 is configured to execute processing logic in computer instructions for performing the operations and steps discussed herein. In this example, the processor 1002 includes an instruction cache 1006 for temporary, fast access memory storage of instructions and an instruction processing circuit 1008. Fetched or prefetched instructions from a memory, such as from a system memory 1010 over a system bus 1012, are stored in the instruction cache 1006. The instruction processing circuit 1008 is configured to process instructions fetched into the instruction cache 1006 and process the instructions for execution. The instruction processing circuit 1008 is configured to insert the fetched instructions into one or more instruction pipelines that are then processed to execution. The memory dependence predictor circuit 1004 predicts load-based CIRDI instructions as having store-forward memory dependencies to then be able to mark such load-based CIRDI instructions as load-based CIMDD instructions for replay.

The processor 1002 and the system memory 1010 are coupled to the system bus 1012 and can intercouple peripheral devices included in the processor-based system 1000. As is well known, the processor 1002 communicates with these other devices by exchanging address, control, and data information over the system bus 1012. For example, the processor 1002 can communicate bus transaction requests to a memory controller 1014 in the system memory 1010 as an example of a slave device. Although not illustrated in FIG. 10, multiple system buses 1012 could be provided, wherein each system bus constitutes a different fabric. In this example, the memory controller 1014 is configured to provide memory access requests to a memory array 1016 in the system memory 1010. The memory array 1016 is comprised of an array of storage bit cells for storing data. The system memory 1010 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1012. As illustrated in FIG. 10, these devices can include the system memory 1010, one or more input device(s) 1018, one or more output device(s) 1020, a modem 1022, and one or more display controllers 1024, as examples. The input device(s) 1018 can include any type of input device, including but not limited to input keys, switches, voice processors, etc. The output device(s) 1020 can include any type of output device, including but not limited to audio, video, other visual indicators, etc. The modem 1022 can be any device configured to allow exchange of data to and from a network 1026. The network 1026 can be any type of network, including but not limited to a wired or wireless network, a private or public network, a local area network (LAN), a wireless local area network (WLAN), a wide area network (WAN), a BLUETOOTH™ network, and the Internet. The modem 1022 can be configured to support any type of communications protocol desired. The processor 1002 may also be configured to access the display controller(s) 1024 over the system bus 1012 to control information sent to one or more displays 1028. The display(s) 1028 can include any type of display, including but not limited to a cathode ray tube (CRT), a liquid crystal display (LCD), a plasma display, etc.

The processor-based system 1000 in FIG. 10 may include a set of instructions 1030 that may include conditional control instructions that cause such instructions to either be CI instructions or CD instructions. The instructions 1030 may be stored in the system memory 1010, processor 1002, and/or instruction cache 1006 as examples of non-transitory computer-readable medium 1032. The instructions 1030 may also reside, completely or at least partially, within the system memory 1010 and/or within the processor 1002 during their execution. The instructions 1030 may further be transmitted or received over the network 1026 via the modem 1022, such that the network 1026 includes the non-transitory computer-readable medium 1032.

While the non-transitory computer-readable medium 1032 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit comprising one or more instruction pipelines;
the instruction processing circuit configured to:
fetch a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions;
speculatively predict a predicate in a conditional control instruction in the instruction stream;
process fetched instructions in the instruction stream comprising fetched instructions in a first CD instruction region among the plurality of CD instruction regions in the instruction stream taken based on the speculative prediction and comprising a load-based CI register data independent (DI) (CIRDI) instruction in a CI instruction region among the at least one CI instruction region;
predict if the load-based CIRDI instruction in a CI instruction region among the at least one CI instruction region is a CI memory data dependent (DD) (CIMDD) instruction, based on predicting if a store-based CD instruction designates a forward store for consumption by the load-based CIRDI instruction;
in response to the load-based CIRDI instruction being predicted as a CIMDD instruction, designate the load-based CIRDI instruction as a CIMDD instruction;
execute the conditional control instruction to resolve the predicate of the conditional control instruction;
determine if the speculative prediction matches the resolved predicate from execution of the conditional control instruction; and
in response to the speculative prediction not matching the resolved predicate from execution of the conditional control instruction, generate a pipeline flush event; and
in response to the generated pipeline flush event:
process the fetched instructions in a second CD instruction region among the plurality of CD instruction regions in the instruction stream taken based on the resolved predicate from execution of the conditional control instruction; and
in response to the load-based CIRDI instruction being designated as a CIMDD instruction, replay the load-based CIRDI instruction.

2. The processor of claim 1, wherein the instruction processing circuit is further configured to:
in response to the load-based CIRDI instruction being predicted as a CIMDD instruction, designate any instructions dependent on the load-based CIRDI instruction as a CIMDD instruction; and
in response to the speculative prediction not matching the resolved predicate from execution of the conditional control instruction, replay the instructions dependent on the load-based CIRDI instruction.

3. The processor of claim 1, wherein the instruction processing circuit is further configured to:

in response to the load-based CIRDI instruction not being predicted as a CIMDD instruction, designate the load-based CIRDI instruction as a pending load-based CIRDI instruction;
execute the load-based CIRDI instruction;
determine if the executed load-based CIRDI instruction consumes a forward store from a store-based CD instruction; and
in response to the executed load-based CIRDI instruction being designated as a pending load-based CIRDI instruction, and determining the executed load-based CIRDI instruction consumes a forward store from a store-based CD instruction:
designate the load-based CIRDI instruction as a CIMDD instruction; and
generate the pipeline flush event.

4. The processor of claim 3, wherein the instruction processing circuit is further configured to, in response to determining the executed load-based CIRDI instruction does not consumes a forward store from a store-based CD instruction:
not designate the load-based CIRDI instruction as a CIMDD instruction.

5. The processor of claim 3, wherein the instruction processing circuit is configured to train a prediction indication in a prediction indicator in a prediction entry among a plurality of prediction entries in a memory dependence predictor circuit indexable by an instruction identifier associated with the load-based CIRDI instruction, based on the executed load-based CIRDI instruction being designated as the pending load-based CIRDI instruction, and determining the executed load-based CIRDI instruction consumes a forward store from a store-based CD instruction.

6. The processor of claim 1, wherein the instruction processing circuit is further configured to:
execute the load-based CIRDI instruction;
determine if the executed load-based CIRDI instruction consumes a forward store from a store-based CD instruction in the first CD instruction region; and
in response to determining the executed load-based CIRDI instruction does not consume a forward store from a store-based CD instruction in the first CD instruction region and the executed load-based CIRDI instruction is designated as a CIMDD instruction, maintain the designation of the load-based CIRDI instruction as the CIMDD instruction.

7. The processor of claim 1, further comprising:
a memory dependence predictor circuit comprising a plurality of prediction entries each indexable by an instruction identifier and each comprising a memory data dependence (MDD) prediction indicator comprising an MDD indication indicating a prediction of a forward store consumption from a store-based CD instruction;
the instruction processing circuit configured to:
predict if the load-based CIRDI instruction is the CIMDD instruction by being configured to:
index a prediction entry among the plurality of prediction entries in the memory dependence predictor circuit based on an instruction identifier associated with the load-based CIRDI instruction; and
access the MDD indication in the MDD prediction indicator in the indexed prediction entry; and
designate the load-based CIRDI instruction as the CIMDD instruction based on the accessed MDD indication.

8. The processor of claim 7, wherein each prediction entry among the plurality of prediction entries further comprises a tag indicator configured to store a tag;
the instruction processing circuit configured to:
index the prediction entry among the plurality of prediction entries in the memory dependence predictor circuit based on an instruction identifier associated with the load-based CIRDI instruction matching a tag of the tag indicator of the prediction entry.

9. The processor of claim 8, wherein the instruction processing circuit is further configured to designate the load-based CIRDI instruction as the CIMDD instruction based on a default MDD prediction indication, in response to the instruction identifier associated with the load-based CIRDI instruction not matching a tag of a tag indicator of a prediction entry among the plurality of prediction entries in the memory dependence predictor circuit.

10. The processor of claim 7, wherein the prediction entry for each of the plurality of prediction entries comprises a fixed MDD prediction indicator indicating a prediction of a forward store consumption from a store-based CD instruction.

11. The processor of claim 7, wherein:
the MDD prediction indicator in each prediction entry among the plurality of prediction entries in the memory dependence predictor circuit comprises a prediction counter configured to store an MDD prediction count as the MDD indication; and
the instruction processing circuit is configured to designate the load-based CIRDI instruction as the CIMDD instruction based on an MDD prediction count in the prediction counter in the indexed prediction entry exceeding a defined threshold count value.

12. The processor of claim 7, wherein the instruction processing circuit is further configured to train a prediction indication in a prediction indicator in a prediction entry among the plurality of prediction entries in the memory dependence predictor circuit that is indexable by an instruction identifier associated with the load-based CIRDI instruction.

13. The processor of claim 12, wherein;
the instruction processing circuit is further configured to:
execute the load-based CIRDI instruction; and
determine if the executed load-based CIRDI instruction consumes a forward store from a store-based CD instruction; and
the instruction processing circuit is configured to train the prediction indication in the prediction indicator in the prediction entry among the plurality of prediction entries in the memory dependence predictor circuit indexable by an instruction identifier associated with the load-based CIRDI instruction, based on the determination if the executed load-based CIRDI instruction consumes a forward store from a store-based CD instruction.

14. The processor of claim 13, wherein the instruction processing circuit is configured to train the prediction indication in the prediction indicator, by being configured to:
reinforce an MDD prediction state in an MDD prediction indication in the prediction indicator in the prediction entry indexable by the instruction identifier associated with the load-based CIRDI instruction, in response to determining the executed load-based CIRDI instruction consumes the forward store from the store-based CD instruction, and the load-based CIRDI instruction designated as a CIMDD instruction.

15. The processor of claim 14, wherein the instruction processing circuit is configured to train the prediction indication in the prediction indicator, by being configured to:
reinforce a non-MDD prediction state in the MDD prediction indication in the prediction indicator in the prediction entry indexable by the instruction identifier associated with the load-based CIRDI instruction, in response to determining the executed load-based CIRDI instruction does not consume the forward store from the store-based CD instruction, and the load-based CIRDI instruction not designated as a CIMDD instruction.

16. The processor of claim 14, wherein the instruction processing circuit is configured to train the prediction indication in the prediction indicator, by being configured to:
adjust the MDD prediction indication in the prediction indicator in the prediction entry indexable by the instruction identifier associated with the load-based CIRDI instruction based on a non-MDD prediction state, in response to determining the executed load-based CIRDI instruction does not consume a forward store from the store-based CD instruction.

17. The processor of claim 13, wherein the instruction processing circuit is configured to train the prediction indication in the prediction indicator, by being configured to:
adjust the prediction indication in the prediction indicator in the prediction entry indexable by the instruction identifier associated with the load-based CIRDI instruction based on an MDD prediction state, in response to determining the executed load-based CIRDI instruction consumes a forward store from the store-based CD instruction.

18. The processor of claim 13, wherein:
the instruction processing circuit is further configured to determine if the load-based CIRDI instruction is younger than the conditional control instruction; and
the instruction processing circuit is configured to train the prediction indication in the prediction indicator in prediction entry, based on the determination if the executed load-based CIRDI instruction consumes a forward store from a store-based CD instruction and the load-based CIRDI instruction being younger than the conditional control instruction.

19. The processor of claim 1, wherein the instruction processing circuit further comprises:
a memory dependence (MD) tracking circuit configured to store at least one MD entry each comprising MD information for a load-based instruction; and
the instruction processing circuit is further configured to:
in response to determining the load-based CIRDI instruction consumes a forward store from the store-based CD instruction, store MD information in an MD entry among the at least one MD entry in the MD tracking circuit associated with the load-based CIRDI instruction designating the load-based CIRDI instruction as a CIMDD instruction; and
in response to the generated pipeline flush event:
in response to the load-based CIRDI instruction being designated as a CIMDD instruction in the MD entry associated with the load-based CIRDI instruction, replay the load-based CIRDI instruction.

20. A method of predicting load-based control independent (CI), register data independent (DI) (CIRDI) instructions as CI memory data dependent (DD) (CIMDD) instructions for replay in speculative misprediction recovery in a processor, comprising:

fetching a plurality of instructions from a memory into an instruction pipeline among one or more instruction pipelines, the plurality of fetched instructions in the one or more instruction pipelines comprising an instruction stream comprising at least one CI instruction region and a plurality of control dependent (CD) instruction regions;

speculatively predicting a predicate in a conditional control instruction in the instruction stream;

processing fetched instructions in the instruction stream comprising fetched instructions in a first CD instruction region among the plurality of CD instruction regions in the instruction stream taken based on the speculative prediction and comprising a load-based CI register data independent (DI) (CIRDI) instruction in a CI instruction region among the at least one CI instruction region;

predicting if the load-based CIRDI instruction is a CIMDD instruction based on predicting if a store-based CD instruction designates a forward store for consumption by the load-based CIRDI instruction;

designating the load-based CIRDI instruction as a CIMDD instruction, in response to the load-based CIRDI instruction being predicted as a CIMDD instruction;

executing the conditional control instruction to resolve the predicate of the conditional control instruction;

determining if the speculative prediction matches the resolved predicate from execution of the conditional control instruction;

generating a pipeline flush event, in response to the speculative prediction not matching the resolved predicate from execution of the conditional control instruction; and in response to the generated pipeline flush event:
    processing the fetched instructions in a second CD instruction region among the plurality of CD instruction regions in the instruction stream taken based on the resolved predicate from execution of the conditional control instruction; and
    replaying the load-based CIRDI instruction, in response to the load-based CIRDI instruction being designated as a CIMDD instruction.

21. The method of claim 20, further comprising:
designating any instructions dependent on the load-based CIRDI instruction as a CIMDD instruction, in response to the load-based CIRDI instruction being predicted as a CIMDD instruction; and replaying the instructions dependent on the load-based CIRDI instruction, in response to the speculative prediction not matching the resolved predicate from execution of the conditional control instruction.

22. The method of claim 20, further comprising:
designating the load-based CIRDI instruction as a pending load-based CIRDI instruction, in response to the load-based CIRDI instruction not being predicted as a CIMDD instruction;

executing the load-based CIRDI instruction;

determining if the executed load-based CIRDI instruction consumes a forward store from a store-based CD instruction; and in response to the executed load-based CIRDI instruction being designated as a pending load-based CIRDI instruction, and determining the executed load-based CIRDI instruction consumes a forward store from a store-based CD instruction:
    designating the load-based CIRDI instruction as a CIMDD instruction; and
    generating the pipeline flush event.

23. The method of claim 20, further comprising training a prediction indication in a prediction indicator in a prediction entry among a plurality of prediction entries in a memory dependence predictor circuit that is indexable by an instruction identifier associated with the load-based CIRDI instruction.

24. The method of claim 23, further comprising:
executing the load-based CIRDI instruction; and determining if the executed load-based CIRDI instruction consumes a forward store from a store-based CD instruction; and wherein training comprises training a prediction indication in a prediction indicator in a prediction entry among a plurality of prediction entries in a memory dependence predictor circuit indexable by an instruction identifier associated with the load-based CIRDI instruction, based on the determination if the executed load-based CIRDI instruction consumes a forward store from a store-based CD instruction.

* * * * *